United States Patent [19]

Bahn

[11] Patent Number: 5,264,772
[45] Date of Patent: Nov. 23, 1993

[54] NUMERICALLY CONTROLLED LOAD ACTUATING APPARATUS

[75] Inventor: Itsuki Bahn, Tokyo, Japan

[73] Assignee: Kabushikigaisha Sekogiken, Tokyo, Japan

[21] Appl. No.: 941,096

[22] PCT Filed: Feb. 27, 1992

[86] PCT No.: PCT/JP92/00217

§ 371 Date: Oct. 26, 1992

§ 102(e) Date: Oct. 26, 1992

[30] Foreign Application Priority Data

Feb. 27, 1991 [JP] Japan ................ 3-115724

[51] Int. Cl.$^5$ ................ H02P 5/40; H02P 6/02
[52] U.S. Cl. ................ 318/701; 318/685; 318/138; 318/254; 318/653
[58] Field of Search ........ 318/138, 254, 696, 700–832, 318/685, 653

[56] References Cited

U.S. PATENT DOCUMENTS

| | | | |
|---|---|---|---|
| 4,670,696 | 6/1987 | Byrne et al. | 318/701 |
| 4,760,320 | 7/1988 | Tsugita | 318/685 X |
| 4,868,478 | 9/1989 | Hedlund et al. | 318/685 X |
| 5,043,643 | 8/1991 | Hedlund et al. | 318/254 |
| 5,097,191 | 3/1992 | Bahn | 318/701 |
| 5,111,091 | 5/1992 | Bahn | 318/254 X |
| 5,138,244 | 8/1992 | Bahn | 318/701 |
| 5,144,215 | 9/1992 | Bahn | 318/701 |
| 5,168,190 | 12/1992 | Bahn | 318/138 X |
| 5,194,795 | 3/1993 | Bahn et al. | 318/685 |

FOREIGN PATENT DOCUMENTS 57-199498 12/1982 Japan .
59-148600 8/1984 Japan .

*Primary Examiner*—Paul Ip
*Attorney, Agent, or Firm*—Staas & Halsey

[57] ABSTRACT

The object of the present invention is to obtain an apparatus for realizing a high-speed numerical control of a load with good efficiency. Required numerical control of a load is carried out in such a manner that the motor drives the load connected to the motor as a DC motor in an initial stage of shifting movement of the load, and, when the braking torque is generated for deceleration, the motor starts to operate as a stepping motor in response to a predetermined number of electric pulses in its final stage. Furthermore, when an armature coil is deactivated while the motor is in operation, a back-flow preventing diode prevents a magnetic energy stored in the armature coil from returning to an electric power source, whereby the magnetic energy is used to charge a small-capacitance capacitor to a high voltage, causing an exciting current to decrease rapidly. When the armature coil is again activated after a predetermined time has elapsed, its exciting current builds up sharply by virtue of a high voltage of the capacitor. Accordingly, the counter torque and the torque reduction can be suppressed, and thus the constitution capable of shifting the load at a high speed and with good efficiency can be realized.

3 Claims, 14 Drawing Sheets

//5,264,772

NUMERICALLY CONTROLLED LOAD ACTUATING APPARATUS

TECHNICAL FIELD

The present invention relates to a high-speed numerically controlled load actuating apparatus, more particularly to a numerically controlled load actuating apparatus which is preferably utilized for a motor which is required to quickly shift or move a load and stop at its stopping position with a high accuracy even in the case where the load is a heavy load such as one having a driving force of, for example, 10 kilogram weight–1000 kilogram weight.

BACKGROUND ART

Conventionally, a stepping motor for light loads has been well known. But, few cases are known as to the motors which have been practically used for providing a stepping motion to transfer a heavy weight at a high-speed.

Besides, there has been no means for realizing a numerical control in transferring a light load in a high speed condition.

A first problem for a heavy-duty stepping motor for numerically controlling a heavy load is that it tends to become large in size. This further poses the following problems.

(a) Due to its large inertia, it requires a considerably long time to finish one complete stepping motion. Thus, its rotational speed becomes so low that its utility is largely spoiled.

(b) Due to its large output torque, a large electric power is required for obtaining adequate acceleration and deceleration in each stepping motion. Thus, a large energy is consumed but also its efficiency is largely deteriorated to become a substantial drawback to its utility.

A second problem for a heavy-duty stepping motor is that it is required to shorten a stepping angle. However, if teeth are provided on magnetic poles for solving this problem, the rotational speed of the motor will be lowered, and thus an overall control time is too elongated for quick response.

Thus, it is an object of the present invention to provide a numerically controlled load actuating apparatus, which is capable of carrying out a numerical control of a load at a high speed and efficiently.

DISCLOSURE OF INVENTION

The present invention provides a numerically controlled load actuating apparatus, wherein a load is driven with a motor having n-phase (n=2, 3, 4, ---) full-wave salient poles or a magnet rotor; said numerically controlled load actuating apparatus comprising;

n-phase armature coils associated with n-phase magnetic poles of a fixed armature;

a current supply control circuit including said respective phase armature coils and a plurality of transistors;

diodes inversely connected in parallel with said respective transistors in said current supply control circuit for returning magnetic energies stored in respective armature coils to an electric power source when said armature coils are deactivated;

a DC electric power source for applying a voltage to said current supply control circuit;

2n pieces of back-flow preventing diode interposed in a forward direction with respect to a positive or a negative terminal of said DC electric power source;

a pulse distributor driven in response to outputs of an oscillator to generate stepping electric signals of n-phase full-wave current supply mode having a predetermined frequency;

small-capacitance capacitors disposed in parallel with said back-flow preventing diodes, respectively;

a position detecting device including a plurality of position detecting elements for detecting rotational positions of salient poles or magnetic poles on said magnet rotor so as to obtain position detecting signals of n-phase full-wave current supply mode;

a first electric circuit for obtaining an electric pulse row having a frequency corresponding to a frequency of said position detecting signals;

a second electric circuit for turning on said respective transistors in the current supply control circuit in response to said position detecting signals to let the DC motor generate a necessary torque;

a third electric circuit for turning on said respective transistors in the current supply control circuit in response to said stepping electric signals to let the stepping motor generate a necessary torque;

a first counter circuit for registering a required amount of shift of load by inputting corresponding number of electric pulse and a second counter circuit for registering approximately half of the number of said electric pulse;

a fourth electric circuit, which starts counting down said first and second counter circuits in response to said electric pulse row to be generated simultaneously with start of said motor, reads out a digital memory stored in a ROM simultaneously, and further reverses the reading out operation of the digital memory of said ROM in response to an output of a zero-count signal from said second counter circuit;

a first rotational speed control device which converts said digital memory into an analogue signal and controls a rotational speed of said motor to a rotational speed corresponding to said analogue signal;

a second rotational speed control device which changes a mode of said motor to generate a braking torque in response to the output of the zero-count signal from said second counter circuit and reduces rotational speed of the motor to a rotational speed corresponding to said analogue signal obtained from said ROM; and a fifth electric circuit, which changes a driving operation mode of the motor to the mode of a stepping motor operation in response to an output signal representing a predetermined residual number, and responds to the output signal representing the zero-count to prevent the output signal of said oscillator from being inputted to said pulse distributer.

Furthermore, the present invention provides a numerically controlled load actuating apparatus, wherein a load is driven with a motor having n-phase (n=3, 4, 5, ---) half-wave salient poles or a magnet rotor; said numerically controlled load actuating apparatus comprising;

n-phase armature coils associated with n-phase magnetic poles of a fixed armature;

a current supply control circuit including said respective phase armature coils and a plurality of transistors;

diodes inversely connected in parallel with said respective transistors in said current supply control circuit for returning magnetic energies stored in respective armature coils to an electric power source when said armature coils are deactivated;

a DC electric power source for applying a voltage to said current supply control circuit;

n pieces of back-flow preventing diode interposed in a forward direction with respect to a positive or a negative terminal of said DC electric power source;

a pulse distributor driven in response to outputs of an oscillator so as to generate stepping electric signals of n-phase half-wave current supply mode having a predetermined frequency;

small-capacitance capacitors disposed in parallel with said back-flow preventing diodes, respectively;

a position detecting device including a plurality of position detecting elements for detecting rotational positions of salient poles or magnetic poles on said magnet rotor so as to obtain position detecting signals of n-phase half-wave current supply mode;

a sixth electric circuit for obtaining an electric pulse row having a frequency corresponding to a frequency of said position detecting signals;

a seventh electric circuit for turning on said respective transistors in the current supply control circuit in response to said position detecting signals so as to obtain an output torque for the DC motor;

an eighth electric circuit for turning on said respective transistors in the current supply control circuit in response to said stepping electric signals so as to obtain a stepping output torque for the stepping motor;

a first counter circuit for registering a required amount of shift of load by inputting corresponding number of electric pulse and a second counter circuit for registering approximately half of the number of said electric pulse;

a ninth electric circuit which starts counting down said first and second counter circuits in response to said electric pulse row generated simultaneously with the start of said motor, and reads out a digital memory stored in a ROM simultaneously, and further reverses the reading out operation of the digital memory of said ROM in response to an output of a zero-count signal from said second counter circuit;

a first rotational speed control device which converts said digital memory into an analogue signal and controls a rotational speed of said motor to a rotational speed corresponding to said analogue signal;

a second rotational speed control device which changes a mode of said motor to generate a braking torque in response to the output of the zero-count signal of said second counter circuit and controls the rotational speed of the motor to decrease down to a rotational speed corresponding to said analogue signal obtained from said ROM; and a tenth electric circuit which shifts a driving operation mode of the motor to that of a stepping motor in response to an output signal indicating a predetermined residual number, and responds to the output signal representing the zero-count to prevent the output signal from said oscillator from being inputted into said pulse distributer.

Moreover, the present invention provides a numerically controlled load actuating apparatus comprising, in addition to above-described first and second means, said first counter circuit for inputting electric pulses corresponding to a required shifting amount of the load to resister its electric pulse number, and said second counter circuit for registering approximately half of said electric pulse number; an eleventh electric circuit which starts counting down said first and second counter circuits in response to said electric pulse row which is generated upon a starting of said motor; a constant-current circuit for holding an armature current to a predetermined value after the motor is started; a twelfth electric circuit for responding to said output signal representing the zero-count of the second counter circuit to brake the motor by generating a reverse torque while maintaining said predetermined armature current, and a thirteenth electric circuit which shifts a driving operation mode of the motor to that of a stepping motor in response to an output signal representing a first predetermined residual number, and responds to the output signal representing the zero-count to prevent the output signal from said oscillator from being inputted into said pulse distributer.

According to the present invention, when the armature coil is deactivated, the magnetic energy stored in the armature coil is prevented from returning to the electric power source by means of the back-flow preventing diode. Further, this magnetic energy is used to charge a small-capacitance capacitor. Therefore, the magnetic energy extinguishes rapidly.

When the armature coil is again activated after a predetermined time has elapsed, a high voltage charged in the capacitor is applied to the armature coil. Accordingly, its exciting current builds up sharply. Thus, a high-speed motor can be obtained.

Furthermore, the motor is operated as a high speed DC motor in a first stage of a shifting movement of a load, without causing noises. Then in a second shifting stage, the motor is driven in a reverse rotation mode to promptly decelerate its speed down to a predetermined speed and, in turn, shift the load at the predetermined speed. Further, in a third shifting stage, the operating mode of the motor is switched to that of a stepping motor to shift the load. Subsequently, stepping signals are prevented from being inputted to stop the shifting movement of the load.

A count value corresponding to the shift amount of the load is registered in the counter circuit. And, above-described first, second, third shifting stages and the stopping point of the load are controlled in accordance with the residual count value counted down by the position detecting signals. Thus, the numerical control of the load can be performed promptly.

As described above, the reverse braking operation is carried out in the second shifting stage of the load so as to decrease the speed rapidly. In this case, it is possible to provide a regenerative braking by changing the operation mode of the motor from a normal rotation mode to a reverse rotation mode. Thus, the motor can be decelerated with good efficiency.

As is explained in the foregoing description, according to the numerical control of the present invention, a load can be shifted to a required position quickly with a maximum efficiency. Furthermore, though a conventional stepping motor generates large mechanical noises when the load is large, a motor in accordance with the present invention can suppress such mechanical noises since the motor is driven as a DC motor during almost all shifting movement of the load.

BEST MODE FOR CARRYING OUT THE INVENTION

Figure 1:
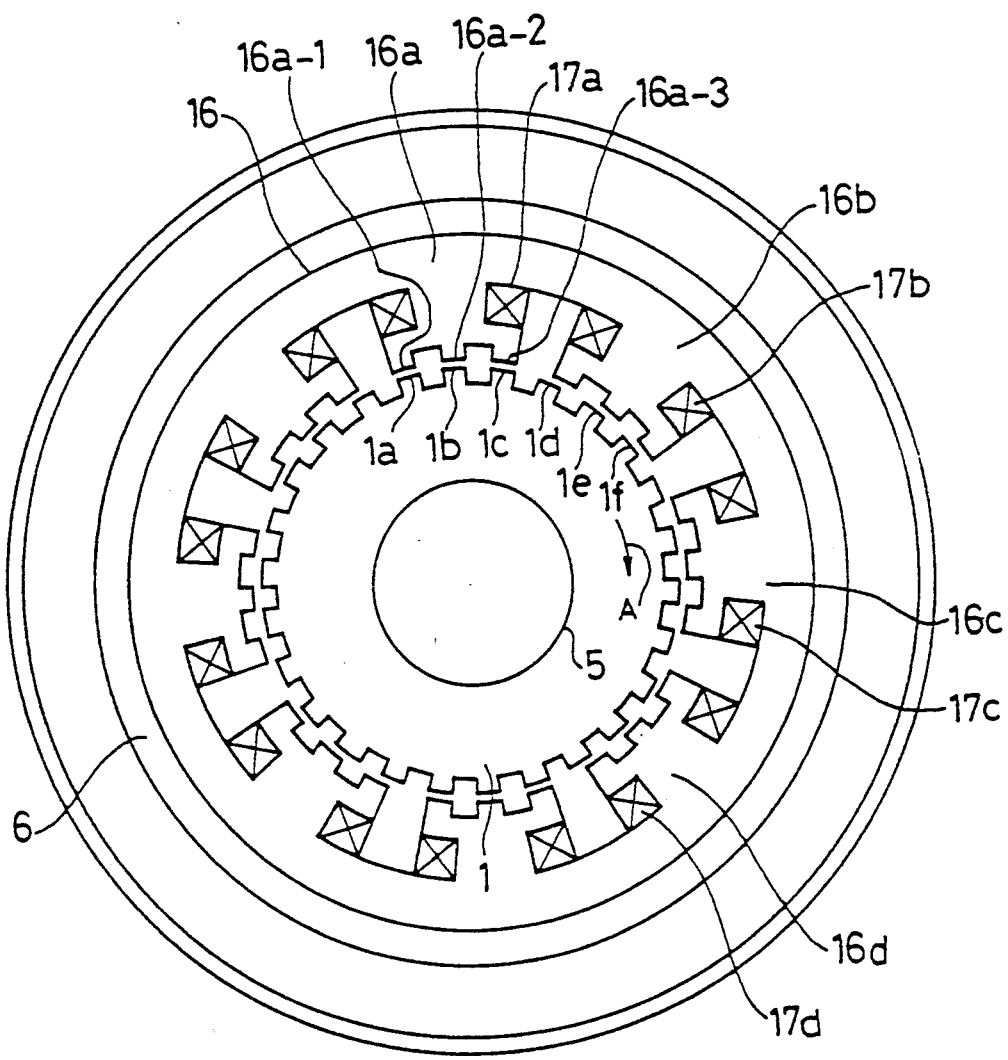
FIG. 1 is a plane view showing a two-phase reluctance type motor.

The present invention will be explained in accordance with its embodiments and with reference to accompanying drawings.

In the drawings, the same reference numeral denotes the same component, and thus their duplicate explanations are omitted.

FIG. 1 shows one example of a two-phase reluctance type motor embodying the present invention, and is a cross-sectional view showing constitutions of salient poles on its rotor, magnetic poles on its fixed armature, and armature coils associated with magnetic poles. In the following description, all the angles represent electric angles.

In FIG. 1, a rotor 1 has a plurality of salient poles 1a, 1b, - - - which have a 180-degree width and are uniformly spaced from one another with a pitch of a 360-degree phase difference, respectively. The rotor 1 is made of a well-known laminated structure of silicon steel plates, and has a rotational shaft 5. Magnetic poles 16a, 16b, - - - are made of the same materials as the rotor 1 together with a fixed armature magnetic core 16 forming a magnetic path.

Magnetic poles 16a, 16b, - - - have edge surfaces provided with protruding teeth 16a-1, 16a-2, - - - , respectively. These teeth have a 180-degree width and are spaced from one another by the same angle. The magnetic poles 16a, 16b, - - - are associated with armature coils 17a, 17b, - - - . Respective magnetic poles 16a, 16b, - - - are disposed on a circumferential surface at a uniform pitch as shown in the drawing. An outer peripheral surface of the fixed armature 16 is coupled with a cylindrical outer casing 6.

Figure 3:
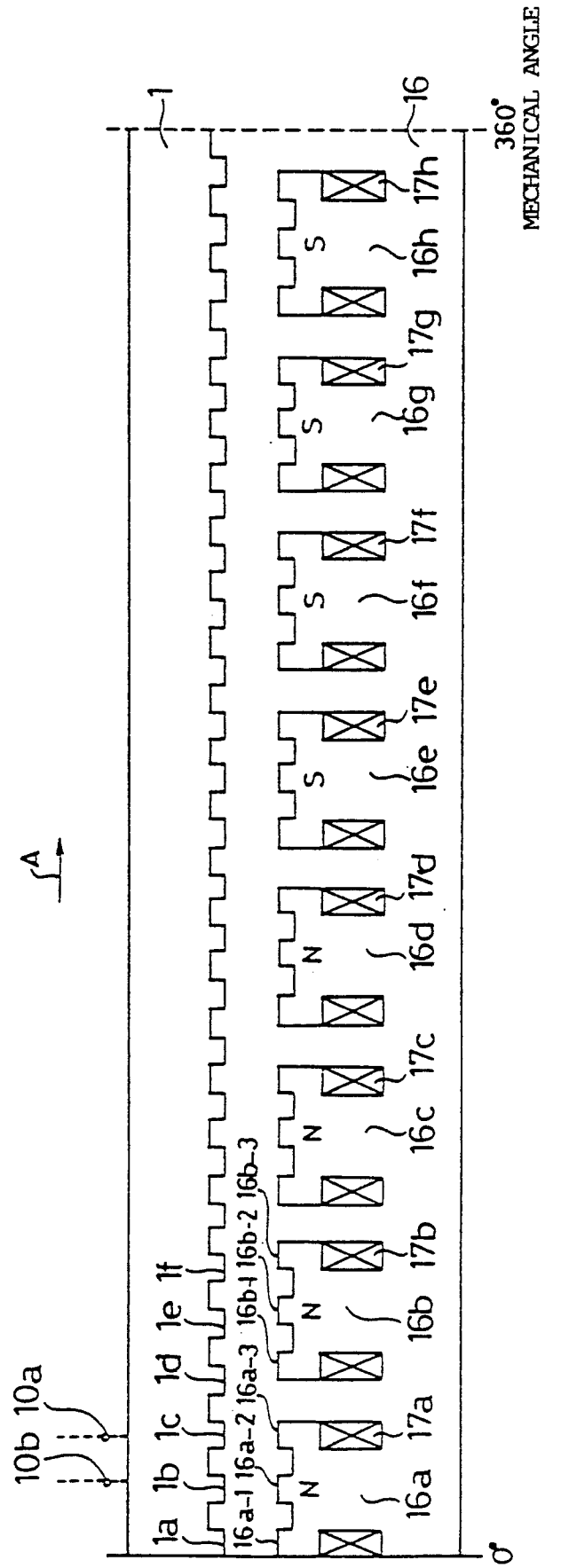
FIG. 3 is a development showing an armature and a rotor of the motor shown in FIG. 1.

FIG. 3 is a development showing above-described magnetic poles and salient poles (i.e. teeth).

The two-phase reluctance type motor in accordance with the present invention has the following problems.

Firstly, a large magnetic attraction force interacting between magnetic poles and salient poles is generated irrespective of a value of an output torque, thereby causing mechanical vibration. In order to suppress this vibration, a pair of magnetic poles to be excited in the same phase are disposed symmetrically about a rotational shaft to provide a balance against the above-described magnetic attraction force.

Figure 15:
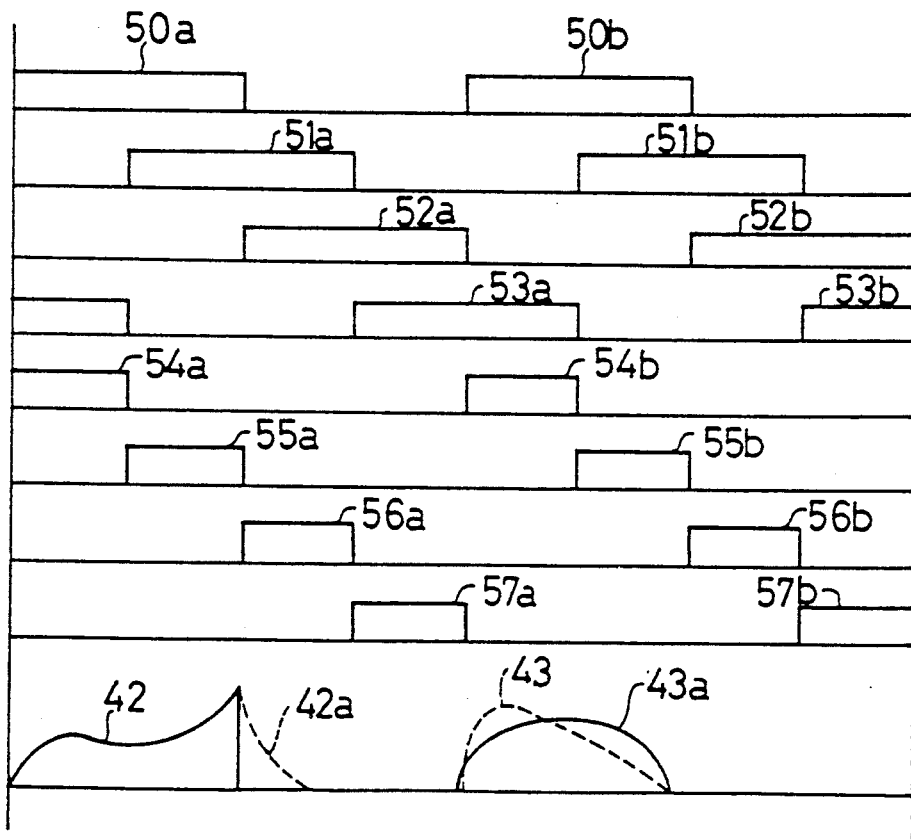
FIG. 15 is a time chart showing two-phase position detecting signals.

Secondly, as shown by a dotted curve 43 in a time chart of FIG. 15, a torque has a conspicuously large value in an initial stage where the salient poles begin facing to the magnetic poles, whereas, the torque becomes small in its final stage. Accordingly, this entails a disadvantage such that a composite output torque comprises a large ripple torque. In order to remove such a disadvantage, for example, the following means is effective.

That is, to differentiate the salient pole and the magnetic pole in the widths of their facing surfaces along a rotational shaft direction. When such a means is taken, an output torque curve becomes flat by the leaking magnetic flux of their facing surfaces as shown by the curve 43a of FIG. 15.

Thirdly, there is a problem of a poor efficiency. An exciting current curve becomes as shown by a curve 42 in FIG. 15. In an initial stage of the current supply operation, the current value is small due to an inductance of the armature coil, and it becomes smaller in an intermediate stage due to the effect of the reverse electromotive force. In a final stage, however, the current increases sharply as shown by the curve 42, since the reverse electromotive force becomes small.

A peak value of the current in this final stage is equal to a current value at the time at which the motor has just started. In this section, only the Joule loss is caused due to the absence of output torque, and this causes a problem such as the substantial fall of the operating efficiency of the motor.

Since the curve 42 has a 180-degree width, the magnetic energy is discharged as shown by a dotted line 42a to induces a counter torque, thereby further deteriorating the efficiency of the motor.

Fourthly, when the output torque is increased, or when the exciting current is increased by increasing the number of teeth of salient poles and magnetic poles, the rotational speed drops conspicuously as another disadvantage of the motor.

In general, in order to increase an output torque of a reluctance type motor, it is necessary to increase the number of the teeth of the magnetic poles and the salient poles shown in FIG. 1 and to reduce a facing gap between the magnetic poles and the salient poles.

In this case, if the rotational speed is held at a predetermined value, a building-up inclination of the exciting current becomes relatively slow due to the magnetic energy stored in the teeth of the magnetic poles 16a, 16b, - - - and the salient poles 1a, 1b, - - - . Furthermore, even when the exciting coil is deactivated, a time required for extinguishing the discharge current of the magnetic energy becomes relatively longer, thereby causing a large counter torque to occur.

Due to such reasons, the peak value of the exciting current becomes small, and the counter torque is generated to cause the fall of the rotational speed. The number of times of cyclic repetition of the storage and discharge of the magnetic energy with respect to any one magnetic pole in the case of the present invention is much larger compared with the well-known three-phase DC motor, and this is largely responsible for the fall of the rotational speed of the reluctance type motor.

It is characteristic of the present invention that the above-described disadvantages can be removed, and the object of the present invention can be accomplished by providing a simple current supply control circuit for the armature coils.

In FIG. 3, when the armature coils 17b, 17f, 17c and 17g are activated, the salient poles 1d, 1e, 1f, - - -which face to the magnetic poles 16b, 16f, 16c and 16g are magnetically attracted to cause the rotor 1 to rotate in a direction of an arrow A. When the rotor 1 rotates 90 degrees, the armature coils 17b and 17f are deactivated, whereas the armature coils 17d and 17h are activated. Thus, salient poles facing to the teeth of the magnetic poles 16d and 16h are magnetically attracted to generate a torque.

The magnetic poles 16b and 16c are magnetized to be N-poles, whereas the magnetic poles 16f and 16g to be S-poles. Such a polarization is effective for suppressing this counter torque deriving from the leaking magnetic flux. If the rotor 1 further rotates 90 degrees, the magnetic poles 16c and 16g and 16d and 16h are magnetized to have S- and N-polarities shown in the drawing. In this subsequent 90-degree rotations, respective magnetic poles also continue to be successively magnetized to the polarities as are shown in the drawing.

When the exciting coils are excited according to the above-described excitement process, the rotor 1 rotates in a direction of an arrow A to function as a two-phase motor. The salient poles shown in FIG. 1 are provided, 36 pieces in number. This number is larger than that of conventional motor of this kind. Thus, the counter torque is generated due to discharge of the magnetic energy stored in the excited magnetic poles to increase the output torque. This increase of the output torque, however, entails too much drop of the rotational speed for the motor to be used on practical basis.

However, according to the means of the present invention, not only the above-described disadvantage can be removed but also only the merit of its large output torque can be utilized additionally. The detail such merit will be explained later.

As shown in FIG. 3, the teeth 16a-1, 16a-2, 16a-3, - - -are provided to each magnetic pole at three-to-one ratio. However, the present invention can be realized even at two-to-one ratio. Furthermore, it is also possible to realize the present invention even at one-to-one ratio, that is, one magnetic pole may be used to function as a tooth too. If it is assumed that the number of teeth provided on one magnetic pole is n pieces, a torque becomes n times that of the case where one magnetic pole is made to function as one tooth.

Next, a means for controlling a current supply to the armature coils 17a, 17b, - - - , 17h will be explained.

Figure 8:
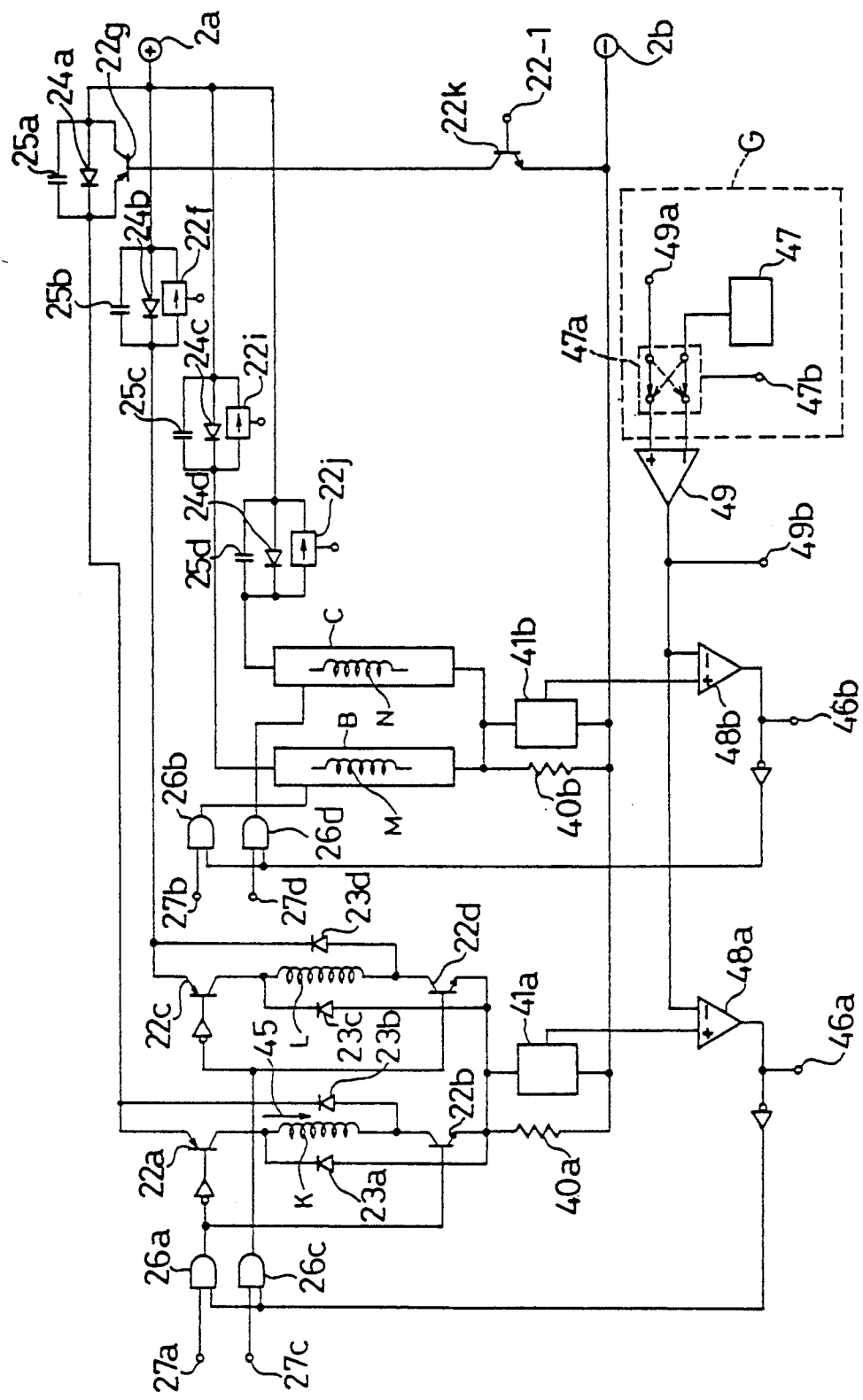
FIG. 8 is a circuit diagram showing a current supply control circuit for the two-phase full-wave current supply mode reluctance type motor.

In FIG. 8, armature coils K and L denote armature coils 17a, 17e and 17c, 17g of FIG. 3, respectively. Two armature coils are connected in series or in parallel. Both ends of the armature coils K and L are arranged to interpose by transistors 22a, 22b, 22c and 22d. These transistors 22a, 22b, 22c and 22d serve as semiconductor switching elements and may be replaced by other semiconductor elements having the same effect.

Electric power is supplied from positive and negative terminals 2a and 2b of the DC electric power source. When a HIGH-level electric signal is inputted from a terminal 27a, the transistors 22a and 22b are turned on to activate the armature coil K. When a HIGH-level electric signal is inputted from a terminal 27c, the transistors 22c and 22d are turned on to activate the armature coil L.

Figure 5:
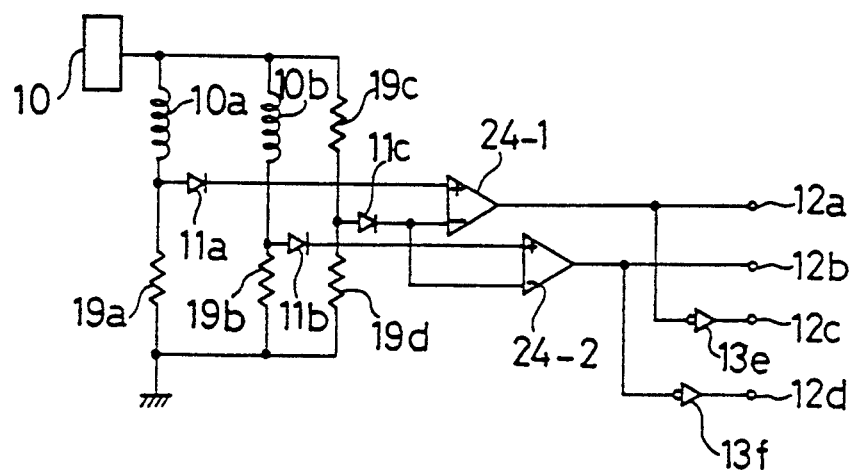
FIG. 5 is a circuit diagram showing an electric circuit for obtaining position detecting signals.

Coils 10a and 10b of FIG. 5 correspond to those suffixed by the same reference numerals in FIG. 3, and are of flat air-core coils of approximately 100 windings having approximately 4 mm diameter.

Next, a means for obtaining position detecting signals inputted from the terminals 27a, 27b, - - - will be explained.

In FIG. 5, the coils 10a and 10b are secured on the fixed armature 16 at the positions indicated in FIG. 3. A reference numeral 10 denotes an oscillator having approximately 1 MHz frequency. The coils 10a and 10b and resistances 19a, 19b, 19c and 19d constitute a bridge circuit. When the coils 10a and 10b face to the salient poles 1a, 1b, - - - , the bridge circuit is balanced so that two inputs of respective operational amplifiers 24-1 and 24-2 become equal.

Above-described inputs are rectified into direct currents by the diodes 11a, 11b and 11c. If smoothing capacitors are provided, the rectification becomes perfect, but these smoothing capacitors are not indispensable. Absence of the capacitors is rather convenient when the circuit has to be integrated.

Outputs of the operational amplifier 24-1 by the coil 10a have rectangular waveforms, as shown by curves 50a, 50b, - - - in the time chart of FIG. 15. Outputs of the operational amplifier 24-2 are position detecting signals by the coils 10b. These electric signals are represented by curves 51a, 51b, - - - .

The coils 10a and 10b are spaced from other by an amount of (180+90) degrees. Accordingly, the phase differences between the curves 50a, 50b, - - - and the curves 51a, 51b, - - - become 90 degrees. Outputs through inversion circuits 13e and 13f become curves 52a, 52b, - - -and curves 53a, 53b, - - - . Above-described position detecting signals are outputted from the terminals 12a, 12b, 12c and 12d. Outputs from the terminals 12a, 12b, 12c and 12d are inputted into the terminals 15a, 15b, 15c and 15d of FIG. 7, respectively.

Figure 7:
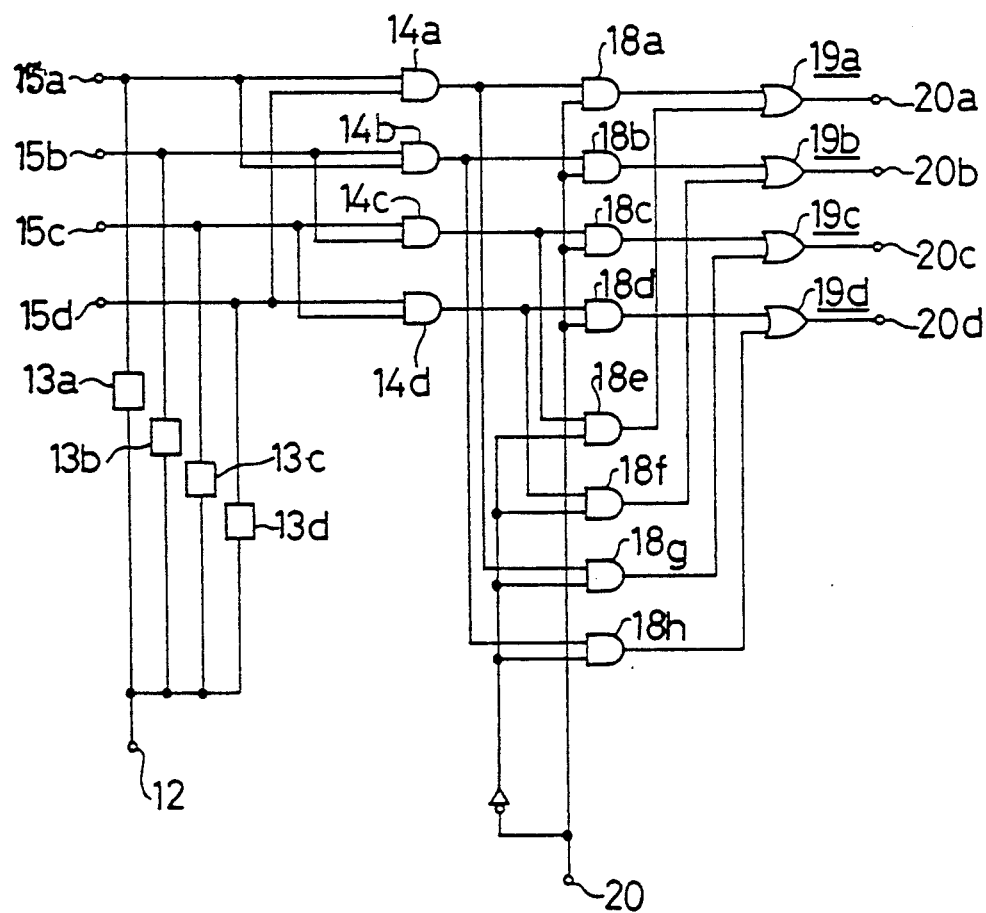
FIG. 7 is a circuit diagram showing an electric circuit for actuating the motor to drive in both normal and reverse directions.

Outputs from an AND circuit 14a of FIG. 7 become only superposing portions of the curves 50a, 50b, - - - and the curves 53a, 53b, - - - as represented by curves 54a, 54b, - - - in FIG. 15. These outputs from the AND circuit 14a have 90-degree width and spaced from one another by an amount of 360 degrees.

Output signals from AND circuits 14b, 14c and 14d become curves 55a, 55b, - - - , curves 56a, 56b, - - - , and curves 57a, 57b, - - - of FIG. 15 by the similar reason. When a HIGH-level input signal is supplied to the terminal 20, the downside inputs of AND circuits 18a, 18b, - - - , 18d become HIGH-levels, so that the inputs from the terminals 15a, 15b, 15c and 15d are outputted from the terminals 20a, 20b, - - - , 20d through OR circuits 19a, 19b, - - - , 19d.

When an input from the terminal 20 is a LOW-level, the downside inputs of AND circuits 18e, 18f, 18g and 18h become HIGH-levels, so that outputs from the terminals 14a, 14b, 14c and 14d are obtained from the terminals 20c, 20d, 20a and 20b, respectively.

Though its detail will be described later, position detecting signals for rotating the motor in a normal or a reverse direction can be obtained when HIGH-level or LOW-level input is made through terminal 20.

Differential circuits 13a, 13b, 13c, and 13d are provided for obtaining differential pulses at the beginning of the input signals supplied to the terminals 15a, 15b, 15c and 15d, respectively. The differential pulses are outputted from the terminal 12.

During a 360-degree rotation of the rotor 1 of the motor, four differential pulses can be obtained. That is, one electric pulse is obtained every time the rotor 1 rotates 90 degrees. Outputs from the terminals 20a, 20b, 20c and 20d are supplied to input terminals 27a, 27b, 27c and 27d of FIG. 8.

Block circuits B and C of FIG. 8 are current supply circuits for controlling an armature coil M (a serial or a parallel circuit of the armature coils 17b and 17f) and an armature coil N (a serial or a parallel circuit of the armature coils 17d and 17h) and have the same constitution as the armature coil K. Position detecting signals inputted into the terminals 27a, 27b, 27c and 27d of FIG. 8 are shown by curves 54a, 54b, - - - of FIG. 15 and three sets of curves indicated below the curves 54a, 54b - - -.

Figure 14:
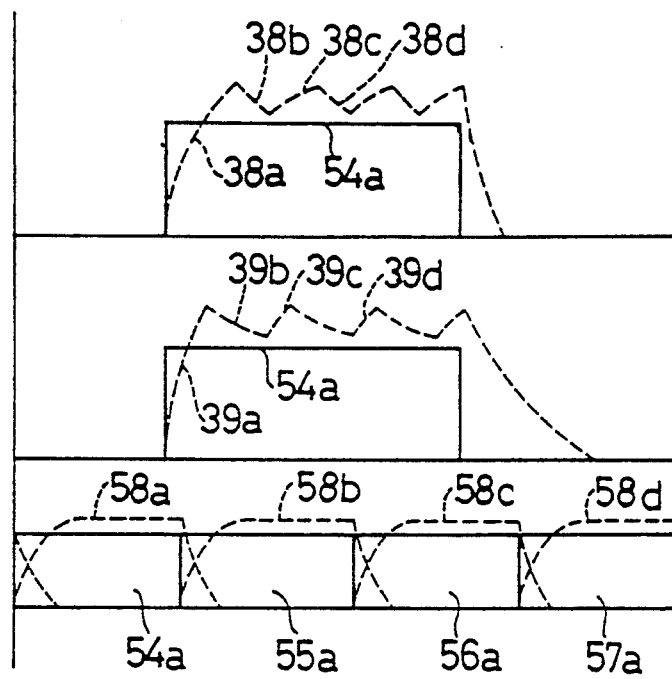
FIG. 14 is a time chart showing exciting currents of armature coils.

Position detecting signals inputted to the terminals 27a, 27b, 27c and 27d of FIG. 8 are represented by curves 54a, 55a, 56a and 57a in the time chart of FIG. 14. When an electric signal of the curve 54a is inputted to the terminal 27a, the armature coil K is activated, and its exciting current flows as shown by the curve 58a.

Since the transistors 22a and 22b are turned off at the end of the curve 54a, the magnetic energy stored in the armature coil K is discharged as shown at a end of the dotted curve. If this discharge current continues exceeding 45 degrees, the counter torque is generated. Furthermore, as an electric signal of the curve 55a is inputted to the terminal 27b, the armature coil M is activated. If a building-up of the increasing current of the armature coil M is delayed, the torque reduction occurs.

As described above, when the time required for the building-up of the exciting current is too long, this will cause the occurrence of the counter torque, whereas the too long trailing-off time, the occurrence of the torque reduction, another disadvantage (of conventional motor). In order to charge a capacitor 25 with the magnetic energy, when the transistors 22a and 22b are turned off, the return of magnetic energy to the DC electric power source through its positive and negative terminals 2a and 2b, as well as through diode 23b, resistance 40a and diode 23a, is prevented by a back-flow preventing diode 24a.

Since this charging voltage is dependent on the capacitance of the capacitor 25a, it is preferable to choose a capacitor of the smallest possible capacitance so that the capacitor can be charged to a highest possible voltage within a range restricted by the withstanding voltage characteristics of the circuit elements.

The capacitor 25a is charged up to a high voltage, and the magnetic energy of the armature coil K is quickly converted into an electrostatic energy of the capacitor 25a, so that the current of the armature coil K decreases steeply, whereby the generation of the counter torque can be prevented.

Next, when the position detecting signal 54b is inputted into the terminal 27a, the armature coil K is again activated. In this case, as a large voltage equal to a summation of the charged voltage of the capacitor 25a and the electric power source voltage is applied to the armature coil K, the exciting current of the armature coil K builds up sharply.

As can be understood from the foregoing description, the building-up and the trailing-off of the exciting current of the armature coil K become sharp. Above-described same principle also applies to other armature coils L, M and N. That is, the exciting currents of respective armature coils build up and decreases rapidly by the functions of the back-flow preventing diodes 24b, 24c and 24d and small-capacitance capacitors 25b, 25c and 25d.

When the motor rotates at a higher speed, widths of the position detecting signals 55a, 55a, - - - become smaller. Thus, the above-described means is essential means for preventing the occurrence of torque reduction and counter torque.

According to the conventional practice, in order to reduce the time required for charging to and discharging from each armature coil the magnetic energy, the voltage applied to the terminals of an armature coil (2a and 2b in the case of this embodiment) has to be increased to a high level. For instance, the voltage has to be increased to as high as 1000 volts or more in order to operate a 1 Kw motor at 20,000 rpm.

Whereas it is characteristic of the means according to the present invention that the storage and discharge of the magnetic energy can be repeated by its own energy, and thus the electric power source voltage level can be set to a practical voltage level.

As the current supply sections of respective coils are of 90 degrees, the efficiency can be improved by adjusting the positions of the coils 10a and 10b of FIG. 3 to realize a maximum torque generating section. For this reason, the positions of the coils 10a and 10b are adjusted so that the exciting coils are activated from the point at which that the rotor 1 has completed its 45-degree rotation from the point at which the salient poles began entering the magnetic poles.

Though the above-described means is also necessary in the case where the motor has to be driven in both normal and reverse directions, this will be explained later.

A current supply control circuit shown in FIG. 8 is characterized by being simpler than that of a conventional two-phase reluctance type motor. This is because the position detecting signals 54a, 55a, - - - are continuous. If there were gaps in the boundaries (which are shown by bold lines in FIG. 14) of the curves 54a, 55a, - - - , exciting currents could not be supplied when the motor was started, and thus its starting operation would become instable. Thus, it is essential requirement not to make any gaps.

Operational amplifiers 48a, 48b, absolute-value circuits 41a, 41b (which serve as rectifying circuits for the voltage drops at the resistances 40a and 40b), AND circuits 26a, 26b, 26c and 26d constitute chopper circuits. Their operations will be explained hereinafter.

An enlarged position detecting signal curve 54a to be inputted to the terminal 27a suffixed with the same numerals is shown in the uppermost part of FIG. 14. A dotted line 38a shows a building-up portion of the exciting current of the armature coil K. When the exciting current increases, and the voltage drop in the resistance 40a, or when an output of the absolute-value circuit 41a exceeds a voltage of the negative terminal of the operational amplifier 48a, a voltage of the standard voltage source 49b, an output of the operational amplifier 48a becomes a HIGH-level, whereas an input to the AND circuit 26a through the inversion circuit becomes a LOW-level, and its output becomes a LOW-level to turn off the transistors 22a and 22b.

Figure 13:
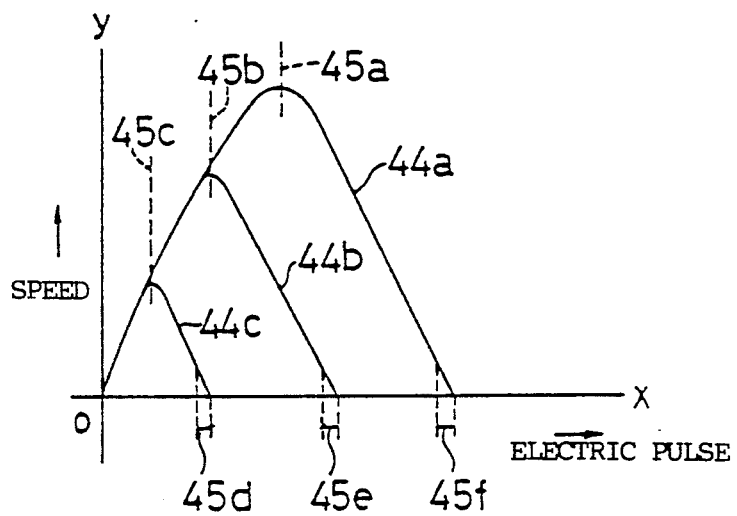
FIG. 13 is a graph showing another example of FIG. 12.

Accordingly, the exciting current returns to the electric power source through the diode 23b and the diode 23a. The curve of this current is shown by a dotted line 38b in FIG. 13. Its detail will be explained later.

When the exciting current decreases down to a predetermined value, an output of the operational amplifier 48a is turned to a LOW-level due to its hysteresis characteristics. Thus, the transistors 22a and 22b are turned on to increase the exciting current as shown by the dotted line 38c. When the exciting current increases up to a predetermined value, the output of the operational amplifier 48a is again turned to a HIGH-level to turn off the transistors 22a and 22b.

By the chopper function for repeating above-described cycle, the transistors 22a and 22b are turned off at the end of the curve 54a, whereby the exciting current decreases rapidly. The above-described chopper function is carried out in the same manner for other exciting coils. A value of the exciting current is regulated by the voltage of the standard voltage source 49b, and a value of the output torque is also controlled in the same way.

As the magnetic poles 16a and 16e shown in FIG. 1 are excited at the same time, magnetic attraction forces interacting between the magnetic poles 16a, 16e and salient poles (which occur in a radial direction irrespective of the value of output torque) are balanced. Thus, the occurrence of the shock such as one to cause the occurrence of the mechanical noise of the bearings can be prevented. This principle applies to other magnetic poles, since a pair of magnetic poles disposed symmetrically with respect to the axis is always excited (simultaneously).

Furthermore, since the exciting sections of the magnetic poles exceed 90 degrees as can be seen from the exciting current curves 58a, 58b, 58c and 58d of FIG. 14, the magnetic attraction forces interacting in a radial direction between adjacent magnetic poles are superposed. Thus, it is characteristic of this arrangement that the generation of the mechanical noises can be suppressed. If the standard voltage of the terminal 49b is varied, the output torque varies correspondingly.

The above-described chopper function is carried out in the same way in the current supply of the armature coil L of FIG. 8. Furthermore, with respect to the armature coils M and N, the chopper function by the resistance 40b, the absolute-value circuit 41b and the operational amplifier 48b is carried out in the same way, and their exciting currents are held to predetermined values.

When a HIGH-level input signal is supplied to the terminal 20 of FIG. 7, above-described current supply is carried out to rotate the motor in a normal direction. If a LOW-level signal is supplied to the terminal 20, input signals of the terminals 27a, 27b, 27c and 27d of FIG. 8 are changed and the input signals of the terminals 27a and 27c are exchanged, and further the input signals of the terminals 27b and 27d are also exchanged. Accordingly, the motor is driven to rotate in a reverse direction.

In the case of the reverse rotation mode, the exciting current control is executed in the same manner as that of the normal rotation mode. However, if the operating condition of the motor is changed to the reverse rotation mode while the motor is driven in the normal rotation mode, a large shock noise and burning of the armature coil may occur. This is because the direction of the electromotive force of the armature coil coincides with the current supply direction in case of the reverse rotation mode, and thus an exciting current becomes large.

Whereas, according to the present invention, the exciting current is held to the predetermined value by virtue of the chopper function even in a reverse rotation mode. Thus, above-described inconvenience can be prevented. So, the motor can be decelerated by being set to reverse rotation mode even during the normal rotation, and the deceleration torque can be changed by controlling the voltage of the standard voltage source 49b.

In a conventional reluctance type motor, the current supply is initiated before the salient poles enter the magnetic poles in order to avoid the generation of the counter torque. If such a motor is rotated in the reverse direction, its output torque is so greatly decreased that the motor cannot be used for practical purpose.

According to the present invention, the torque curve becomes as shown by a curve 43a of FIG. 15. The armature coil is activated from the point at which the salient poles begin to enter the magnetic poles by an amount of 45 degrees even if the motor is driven in the reverse rotation mode. Therefore, the output torque remains unchanged regardless of whether the motor is in the normal rotation mode or in the reverse rotation mode. Thus, the above-described disadvantage can be removed.

Since the reluctance type motor has no field magnet, there is no means for electromagnetically braking the rotor 1 when the electric power is turned off; however, the motor can be braked or decelerated by changing its operation mode to the reverse rotation mode.

In this case, the current supply to the armature coil K will be explained hereinafter. The reverse electromotive force is generated in a direction of an arrow 45 of FIG. 8, and a voltage applied to the armature coil K becomes V+E. The symbol V denotes a voltage applied between the terminals 2a and 2b, whereas the symbol E denotes the reverse electromotive force i.e. the electromotive force which is caused by the reduction of magnetic flux amount crossing the armature coil K.

Accordingly, by the position detecting signal of the curve 54a in the second stage of the time chart of FIG. 14, the exciting current increases sharply as shown by the dotted lines 39a, 39c, - - - .

When the exciting current has increased up to a predetermined value, an output of the operational amplifier 48a becomes a HIGH-level. Therefore, the transistors 22a and 22b are turned off, and the current supply direction and the direction of the reverse electromotive force due to the magnetic energy stored in the armature coil K coincide with each other. Though the above-described current supply direction becomes a reverse direction while the motor is driven in the normal direction, the braking torque is generated because of the reverse rotation mode. Thus, the current supply direction and the direction of the reverse electromotive force become the same direction.

Accordingly, the current flowing through the diodes 23a and 23b acts to return the stored magnetic energy to the electric power source by the voltage of V+E. As a result, the reduction rate of the current becomes smaller than that of the normal rotation mode, and thus width of the trailing-off portion of the current increase.

In FIG. 14, widths of the dotted lines 39a, 39c, - - -are smaller than those of the dotted lines 39b and 39d. Though electric power is consumed in the sections of the dotted lines 39a, 39c, - - - , a consumption amount of electric power is small as their time widths are small. Whereas, in the sections of the dotted lines 39b, 39d, - - - , the rotor energy and the load energy are transformed into electric power and recovered into the electric power source. Since the time widths of the sections of the dotted lines 39b, 39d, - - - are larger, the regenerative braking effect can be obtained.

When the magnetic energy is returned to the electric power source to recover the load energy, its current is obstructed by the diode 24a, and so it flows towards the electric power source through the transistor 22g. A terminal 22-1 is connected to the terminal 46a, so that, during a period of time through which the armature coil K is deactivated, or during a period of time through which the output of the operational amplifier 48a is a HIGH-level, the transistors 22k and 22g are turned on.

Thus, as described above, the regenerative braking is carried out in the sections of the curves 39b, 39d, - - -of FIG. 14. When the armature coil is deactivated at the terminal end of the position detecting signal 54a, the exciting current is decreased, and the output of the operational amplifier 48a is turned to a LOW-level, so that the transistors 22k and 22g are also turned off. Thus, the magnetic energy stored in the armature coil K is prevented from returning to the electric power source by means of the diode 24a to charge the small-capacitance capacitor 25a to a high voltage. Thus, the current decreases quickly.

Another of the available function is that the current can be built up rapidly when the armature coil K is activated again. Furthermore, a function of the regenerative braking is also available. As the above-described transistors 22k and 22g have the same function and effect even in the normal rotation mode in which the previously described regenerative braking is not available, the magnetic energy of the armature coil is returned to the electric power source in the sections of the curves 38b and 38d of FIG. 14. The functions of the diodes 24b, 24c and 24d, and the small-capacitance capacitors 25b, 25c and 25d are the same when other armature coils L, M and N are activated.

In this case, transistors connected in parallel with the diodes are suffixed with reference numerals 22h, 22i and 22j. The desired object can be accomplished by activating the transistor 22h in response to the HIGH-level output from the terminal 46a, and also by activating the transistor 22i and 22j in response to the HIGH-level output from the terminal 46b.

Though the back-flow preventing device including the diodes 24a, 24b, - - - is provided on the side of the positive terminal 2a of the electric power source, the same purpose can be accomplished even when this device is provided on the side of the negative terminal 2b of the electric power source. Furthermore, the same purpose can be accomplished even when the capacitors 25a, 25b, - - - are connected between the output terminals of the diodes 24a, 24b, - - - and the negative terminal 2b of the electric power source.

In the case where the terminals 2a and 2b are terminals of a battery, the electric power regenerated in the previously described reverse rotation mode is recovered by charging this battery. In the case of a DC electric power source provided by rectifying an AC electric power source, the electric power can be recovered into the AC electric power source by a conventional means in which a negative converter is utilized.

Above-described embodiment corresponds to the case where the activation of the exciting coil is initiated after the salient poles enter the magnetic poles by 45 degrees; the exciting current of 90-degree width is supplied to the exciting coil; and further its output torque curve is symmetrical as shown by the curve 43a of FIG. 15.

However, in order to obtain a maximum torque in the case of the torque curve 43, it is necessary to start the activation of the exciting coil from the point at which the salient poles begin entering the magnetic poles and to continue the activation during 90 degrees. In such a case, if the motor is operated in a normal rotation mode, electric signals of the curves 54a, 54b, - - - , curves 55a, 55b, - - - , curves 56a, 56b, - - - , and curves 57a, 57b, - - - of FIG. 15 are inputted to the terminals 27a, 27b, 27c, and 27d of FIG. 8.

Whereas, if the motor is operated in a reverse rotation mode, electric signals obtained by offsetting the curves 54a, 54b, - - - , curves 55a, 55b, - - - , curves 56a, 56b, - - - , and curves 57a, 57b, - - - by 90 degrees toward the right direction are inputted to the terminals 27c, 27d, 27a, and 27b. That is, the input signal of the terminal 27c becomes the curves 55a, 55b, - - - ; the input signal of the terminal 27d, the curves 56a, 56b, - - - ; the input signal of the terminal 27a, the curves 57a, 57b, - - - ; and the input signal of the terminal 27b, the curves 54a, 54b, - - - .

Next, with reference to FIG. 11, a numerical control of the load will be explained.

Figure 11:
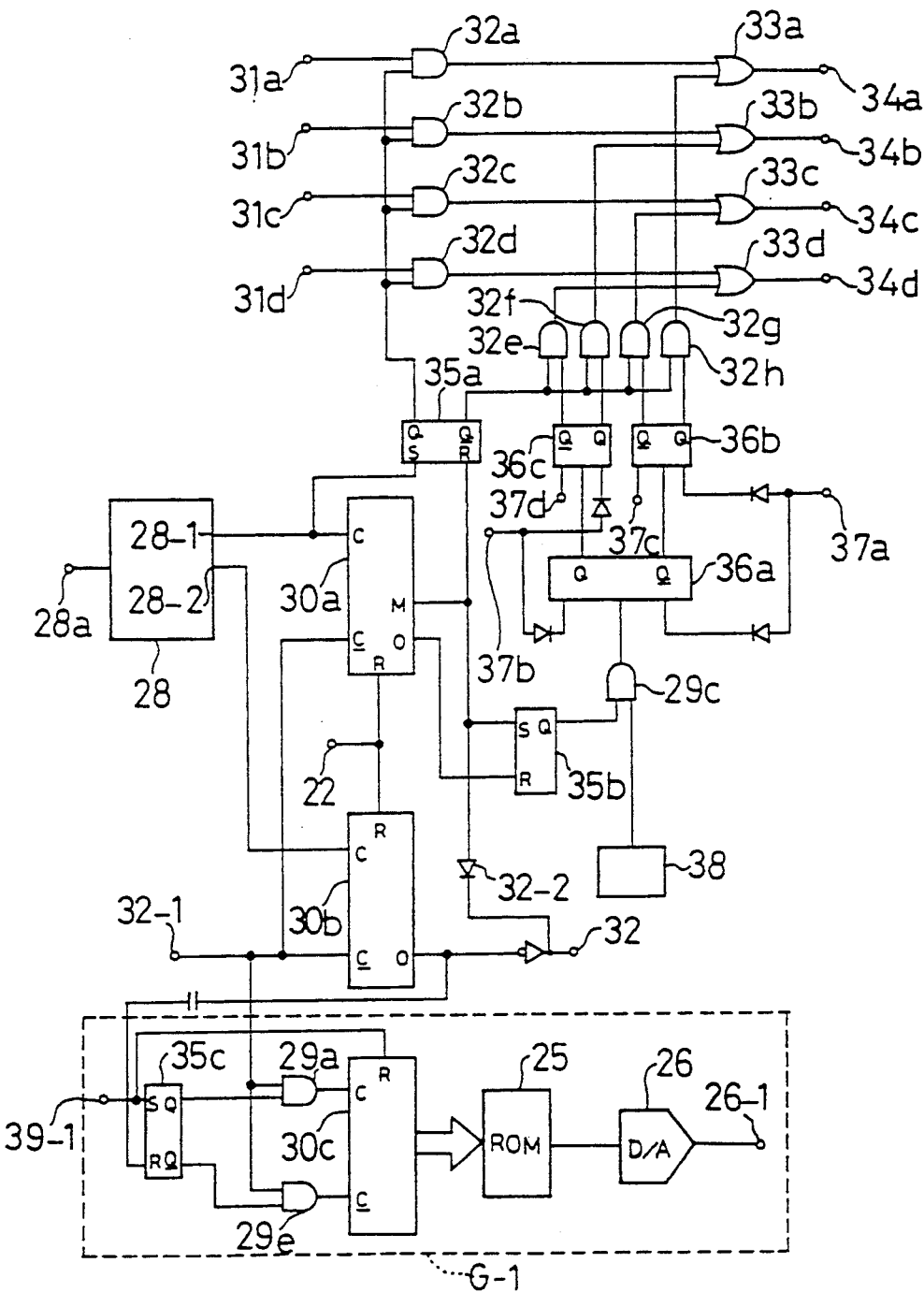
FIG. 11 is a circuit diagram showing a logic circuit for performing a numerical control.

In FIG. 11, a computer 28 stores only the kinds of the numerical data required for the numerical control of the load. When an electric signal is inputted to a terminal 28a for commanding N pieces of pulse required for the numerical control of the load, N pieces of pulse are generated from a terminal 28-1 and registered in a counter circuit 30a. At the same time, N/2 pieces of pulse are generated from a terminal 28-2 and registered in a counter circuit 30b. A set signal is inputted from a terminal 22 to reset to zero respective counter circuits before the above-described registering operation.

Terminals 31a, 31b, 31c and 31d are supplied with output signals of the terminals 20a, 20b, 20c and 20d of FIG. 7. Output signals from terminals 34a, 34b, 34c and 34d are inputted to the terminals 27a, 27b, 27c and 27d of FIG. 8 to serve as position detecting signals.

An output signal of the terminal 12 of FIG. 7 is inputted to a terminal C of the counter circuit 30a through a terminal 32-1 so that the registered number can be counted down by one every time the motor rotates 90 degrees. As soon as the computer 28 finishes the previously described registering operation, a signal is inputted to an S-terminal of a flip-flop circuit 35a, and the downside input terminals of the AND circuits 32a, 32b, 32c and 32d become HIGH-levels. Furthermore, as the input signal of the terminal 20 of FIG. 7 also becomes a HIGH-level, the operational mode of the motor is changed to a normal rotation mode. The detail of this process will be described later.

When the electric power source is turned on, the motor is driven to rotate at a predetermined speed. This speed is regulated by an input voltage from the terminal 49a of FIG. 8. A reference numeral 47 of FIG. 8 denotes a rotational speed detecting device of the motor. An electric signal proportional to the rotational speed is inputted into a negative terminal of the operational amplifier 49.

Since an input voltage of the negative terminal of the operational amplifier 49 is low when the activation of motor is just initiated, an output voltage of the operational amplifier 49 is relatively so, that the corresponding current supply is made by the chopper circuit.

In this case, the terminal 49b is removed. When the motor is accelerated, the output voltage of the operational amplifier 49 is lowered, and its output torque is also lowered, so that the motor is controlled to rotate at a constant speed, with a torque corresponding to the load. In this case, the rotational speed is proportional to the input voltage of the terminal 49a. The input voltage of the terminal 49a is equal to an output voltage of the terminal 26-1 of FIG. 11. The detail of this relationship will be explained later.

When the motor is started, an output of a zero-count of the counter circuit 30b is a LOW-level, so that an output of the terminal 32 becomes a HIGH-level. Since the terminal 32 is connected to the terminal 20 of FIG. 7, the motor rotates in a normal direction. The load is also shifted in response to the rotation of the motor. As the set pulse is inputted to the terminal 39-1 before the motor is started, the counter circuit 30c is reset to zero. Concurrently, the S-terminal of the flip-flop circuit 35c is energized, so that the downside input of the AND circuit 29a becomes a HIGH-level.

As the load is shifted, the counter circuits 30a and 30b are counted down by the input signals to the C-terminal, in accordance with the input pulse from the terminal 32-1, whereas, the counter circuit 30c is counted up. Digital memories prestored in respective addresses in the ROM 25 are read out in response to the count number of the counter circuit 30c. Read-out digital signals are transformed into analogue signals through a D/A converter 26, and inputted to the terminal 49a of FIG. 8 through the terminal 26-1. Thus, the motor rotates at a speed corresponding to the analogue signal to shift the load.

The digital memories stored in the respective characteristics of the load so that the load can be shifted in a minimum necessary time.

When N/2 pieces of pulse are inputted from the terminal 32-1, the counter circuit 30b becomes a zero-count. With this output, the output from the terminal 32 is turned to LOW-level. Thus, the operation mode of the motor is changed to a reverse rotation mode to generate the braking torque, which decelerates the motor.

At the same time, an output of the terminal 32 is inputted to the terminal 47b of FIG. 8 to change over the analogue switch 47a from a connection indicated by solid arrows to a connection indicated by dotted arrows. Therefore, the terminal 49a is connected to the negative terminal of the operational amplifier 49, and the output of the speed detecting circuit 47 is supplied to the positive terminal.

Simultaneously, the R-terminal of the flip-flop circuit 35c receives an input signal, and so its output signal is inverted, thereby causing the downside input of the AND circuit 29b to become a HIGH-level. Thus, the input pulse of the terminal 32-1 is inputted into the C-terminal for countdown so that the reading-out of the respective addresses of the ROM 25 is reversed.

As the exciting current of the motor is proportional to the output voltage of the terminal 26-1, its braking torque is also proportional. Therefore, the shifting load is accelerated in an initial stage of the whole stroke and is decelerated after it has passed a half of the whole stroke. The rotational speed is decreased in response to an output of the terminal 26-1. When the residual count number of the counter circuit 30a is decreased to a small value such as 10 counts, an output is generated from the m-terminal, and the motor is made to function as a stepping motor to shift the load. The detail of this process will be explained hereinafter.

An oscillation circuit 38 generates clock pulses of a predetermined frequency. The clock pulses energize the JK type flip-flop circuit 36a through the AND circuit 29c. Since the JK type flip-flop circuits 36b and 36c are energized by the output signals of the Q- and Q-terminals of the JK type flip-flop circuit 36a, the Q- and Q-terminals of the JK type flip-flop circuit 36b generate output signals for actuating one phase of the stepping drive motion, whereas the Q- and Q-terminals of the JK type flip-flop circuit 36c generate outputs for actuating the other phase of the stepping drive motion, such phase being supposed to delay by 90 degrees from above-described one phase.

Above-described two-phase stepping outputs are outputted through the AND circuits 32e, 32f, 32g and 32h, and the OR circuits 33a, 33b, - - - , 33d. Hence, these output signals become the output signals from the terminals 34a, 34b, - - - , 34d, and the circuit of FIG. 8 is energized to actuate the motor as a two-phase stepping motor.

In the section where the Q-terminal of the flip-flop circuit 35a outputs a HIGH-level, the position detecting signals inputted from the terminals 31a, 31b, - - - , 31d are outputted from the terminals 34a, 34b, - - - , 34d, so that the motor can be operated as a two-phase reluctance motor. when the residual count number of the counter circuit 30a becomes m, the output of the flip-flop circuit 35a is inverted, and the output of the Q-terminal becomes a HIGH-level.

Accordingly, the input signals of the terminals 31a, 31b, - - - , 31d are interrupted, and the outputs of the JK type flip-flop circuits 36b and 36c are outputted from the terminals 34a, 34b, - - - , 34d. Thus, the motor becomes to operate as a stepping motor. When the residual count number becomes zero, the R-terminal of the flip-flop circuit 35b is energized and inverted, whereas the Q-terminal becomes a LOW-level. Therefore, the output of the Q-terminal of the flip-flop circuit 35b is turned to a LOW-level, and the clock pulse outputted through the AND circuit 29c is extinguished. Then, the operation of the flip-flop circuit 36a is stopped.

Accordingly, the two-phase stepping motion is stopped, and the shifting movement of the load is also stopped by the locking torque, thereby enabling the numerical control of the load.

The requirements to be met in performing the above-described operation are as follows: when residual count number becomes m, the output signal from the terminal 32 is turned to a HIGH-level in response to a HIGH-level signal inputted through the diode 32-2, and the motor, whose rotational speed is controllable, is converted into a stepping motor to operate in a normal rotational mode. In this case, however, it is necessary to simultaneously apply the stepping output to the exciting coil activated by the position detecting signal so that the motor can be driven in the same direction. A means required for this operation will be explained hereinafter.

Output signals of rectangular waveform from the terminals 34a, 34b, 34c and 34d i.e. differential pulses from differential circuits (not shown), which differentiate building-up portions of the input signals from the terminals 31a, 31b, 31c and 31d, are inputted to the terminals 37a, 37b, 37c and 37d, respectively.

Accordingly, output signals from the Q- and $\bar{Q}$-terminals of the JK type flip-flop circuits 36b and 36c can be shown by the curves 50a, 50b, - - -, the curves 52a, 52b, - - -, the curves 51a, 51b, - - -, and the curves 53a, 53b, - - - of FIG. 15, respectively. Hence, the output signals of the Q- and $\bar{Q}$-terminals fed from the flip-flop circuits 36b and 36c become the same electric signals as the position detecting signals obtained in the case where the motor is driven as a DC motor.

If the residual count number becomes m, and the position detecting signal is already obtained from the terminal 34a while the motor is in operation, two input signals of the AND circuit 32h become HIGH-levels together as the differential pulse is already inputted from the terminal 37a. Thus, the output signal of the Q-terminal of the JK type flip-flop circuit 36b is outputted from the terminal 34a, and the position detecting signal fed from the AND circuit 32a is interrupted. A time width between output pulses generated from the clock pulse generating circuit 38 is set slightly larger than a half width of the curve 50a of FIG. 15.

When an output pulse is next inputted through the above-described AND circuit 29c, an output is obtained from the Q-terminal of the JK type flip-flop circuit 36a. Then, the JK type flip-flop circuit 36c generates the output of the Q-terminal, and an output of the terminal 34b is obtained through the AND circuit 32f. When the output signals from the clock pulse oscillation circuit 38 are inputted successively, the motor can be operated as a stepping motor. Above-described condition will remain the same regardless of the terminal used out of the terminals 34b, 34c and 34d for the input of position detecting signal when the mode of the motor is changed to be driven as a stepping motor. Thus, the operation mode of the motor can be changed smoothly to the stepping rotation mode without causing any hunting phenomenon.

As can be understood from the foregoing description, it becomes possible to numerically control the load according to the data which are programmed in the computer 28. If the motor is driven in a reverse rotation mode to shift the load, the above-described stepping operation is correspondingly reversed.

Since the motor is driven in the reverse rotation mode when the load has to be shifted in the opposite direction, either the input signals of the terminals 27a and 27c of FIG. 8 or the input signals of the terminals 27b and 27d may be used selectively depending on the circuit to be used.

As can be understood from the above-described explanation, the motor is used as a reluctance type motor in almost all the shifting movement of the load because of its high operating efficiency, but it is used as a stepping motor for the last short distance corresponding to several −10 pulses shortly before the motor is stopped. Thus, the function and the effect of this motor lie in that the load can be quickly and efficiently shifted over a predetermined distance. This technique is especially useful in the cases of the motors with large output.

Though the motor is operated as a stepping motor by an amount corresponding to m pieces of pulse in the final stage of the shifting movement of the load, it will be possible to shift the load more quickly if there is further provided a means for gradually reducing the frequency of the clock pulses.

If a speed reduction device such as a ball-and-screw device is additionally provided between the motor and the load, the motor speed is reduced by this speed reduction device, and, thus the load can be moved by a large output torque, whereby a shifting amount per one stepping motion of the motor can be reduced, and its thrust force increase. For example, this thrust force can be increased up to approximately 10 Kg-1000 Kg.

Figure 12:
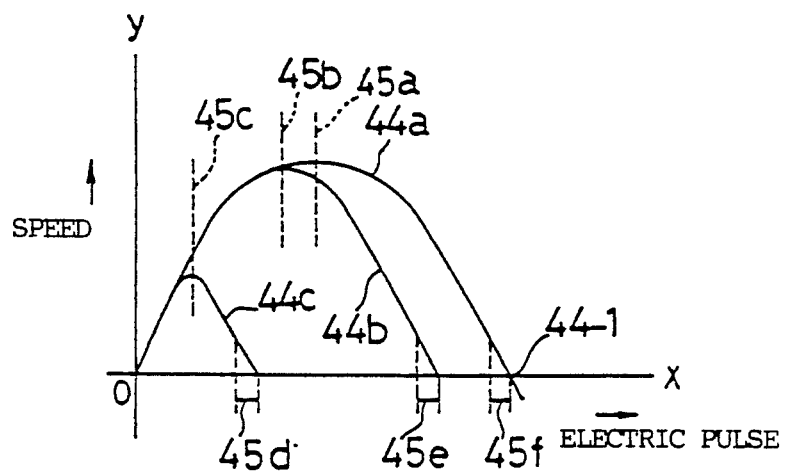
FIG. 12 is a graph showing a relationship between an electric signal pulse and a rotational speed of the motor for performing the numerical control.

In FIG. 12, an X-axis denotes the electric pulse number used for the numerical control of the load, whereas an Y-axis denotes the motor speed. Hereinafter, the numerical control in accordance with the curve 44a will be explained.

After the motor is started, the motor speed is increased by being controlled in accordance with the output of the terminal 26-1 (i.e. the memory in the ROM 25) of FIG. 11. Then, the motor is braked for deceleration at the point on the dotted line 45a, which corresponds to the point at which the registered value of the counter circuit 30a is counted down to a half value, and after the residual count number has become m, the motor starts to function as a stepping motor, and stops at the point of zero-count. A section indicated by an arrow 45f corresponds to a section for the above-described stepping movement.

When the number of the electric pulse used for numerically controlling the load is small, the numerical control is carried out as shown by the curves 44b and 44c. The dotted line 45b or 45c denotes a position where the registered number in the counter circuit 30a is counted down to a half value. Furthermore, an arrow 45e or 45d denotes a section in which the motor is driven as a stepping motor. Though the positions of the dotted lines 45a, 45b and 45c are respectively determined as a half value of the registered number of the counter circuit 30a in this embodiment, these positions can be adjusted together with the residual count value m depending on a necessary thrust force of the load and an inertia of the load.

It is further possible to add a learning function to the computer to automatically execute the above-described adjustment so that the numerical control of the load can be carried out within a minimum time.

The present invention can be carried out even by removing the portion surrounded by a dotted line G and the operational amplifier 49 of FIG. 8 so as to input the standard positive voltage from the terminal 49b. Also, a portion surrounded by a dotted line G-1 in FIG. 11 can be removed.

The motor can be controlled to rotate with a constant torque corresponding to the input signal from the terminal 49b. This is because the exciting currents of respective armature coils become predetermined values. Its operation will be explained with reference to FIG. 13.

In case of the curve 44a, after start the motor is accelerated with a constant torque until the driving condition reaches the dotted line 45a (i.e. until the registered value of the counter circuit 30a is counted down to a half value). After this point, however, the operation mode of the motor is changed to a reverse rotation mode to for the deceleration by braking. When the residual count number of the counter circuit 30a becomes m pulses, the motor is driven as a stepping motor during the section of the arrow 45f, and stops when the residual count number of the counter circuit 30a becomes zero pulses. Its function and effect are the same as the previous embodiment. This method becomes a useful technique in the case where the load is light.

The position of the dotted line 45a should be moved towards the right for adjustment so that the motor can be prevented from being excessively decelerated to stop before the operating condition reaches the section of the arrow 45f. In this case, it is also necessary to increase the value of the residual pulse number m.

The case wherein the registered number of the counter circuit 30a is smaller is shown as the curve 44b or 44c. The dotted lines 45b and 45c denote points where the registered value is counted down to a half value. The arrows 45e and 45d show sections in which the motor is operated as a stepping motor. In the case where the registered value of the counter circuit 30a is smaller than m pulses, a HIGH-level electric signal is inputted into the R-terminal of the flip-flop circuit 35a in response to the output signal supplied from the computer 28. By the output signal of the Q-terminal, the left-hand outputs of the AND circuits 32h, 32g, - - - become HIGH-levels. Thus, the motor is driven as a stepping motor from the starting time of the motor. Accordingly, the load can be stopped by the corresponding stepping number.

The widths of the salient poles 1a, 1b, - - - decrease if the teeth of the magnetic poles are increased. Therefore, the diameters of the coils 10a and 10b explained in FIG. 5 becomes smaller to deteriorate their practicability. In such a case, the coil cannot be used as position detecting element. Because, there is a limitation in decreasing the diameter of the coil. That is, the resolution of the position detecting signal tends to decline as the width of salient pole decreases. In order to solve such a problem, it is recommendable to utilize the magnetic resistance element adopted in a conventional magnetic encoder as the position detecting element.

Figure 6:
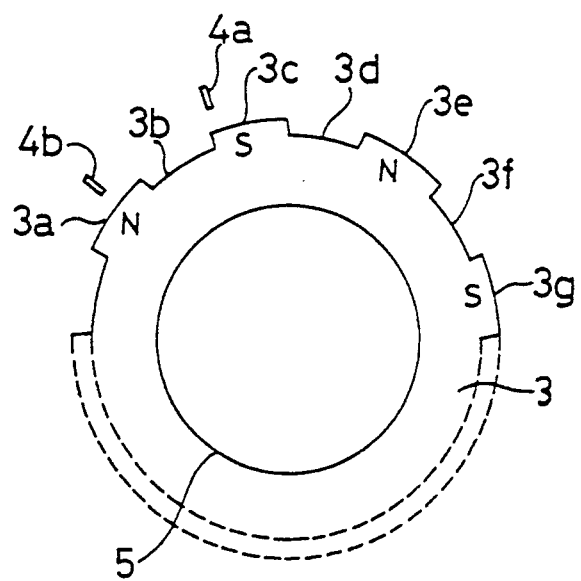
FIG. 6 is an illustrative view showing a position detecting signal device including magnetic resistance elements.

Next, its example is explained with reference to FIG. 6. A rotational shaft 5 is fixed to a plastic magnet ring 3. On an outer peripheral surface, there are provided with protruding portions 3a, 3c, 3e, - - - and recessed portions 3b, 3d, - - - . A width of the protruding portion is equal to that of the recessed portion. The protruding portions 3a, 3c, 3e, - - - are magnetized to be N-pole and S-pole alternately as shown in the drawing. A downside portion indicated by dotted lines is provided with protruding magnetic poles having the same constitution. Either a magnetic element or a semiconductor element may be adopted as the magnetic resistance element. Magnetic resistance elements 4a and 4b are spaced from each other by (90+180) degrees and are faced to the protruding magnetic poles 3a, 3c, - - - through an air gap. When the rotational shaft 5 rotates counterclockwise, the position detecting signals obtained from the magnetic resistance elements 4a and 4b become the same as those obtained in the case of the coils 10a and 10b. Though the reluctance type motor explained above is of a two-phase full-wave current supply mode, the means of the present invention can be applied even to a three-phase half-wave or a three-phase full-wave reluctance type motor.

Furthermore, the means of the present invention can be applied even to an n-phase (n=2, 3, - - - ) full-wave or an n-phase (n=3, 4, - - - ) half-wave reluctance type motor. Next, the case of a three-phase half-wave or a three-phase full-wave reluctance type motor will be explained.

Figure 4:
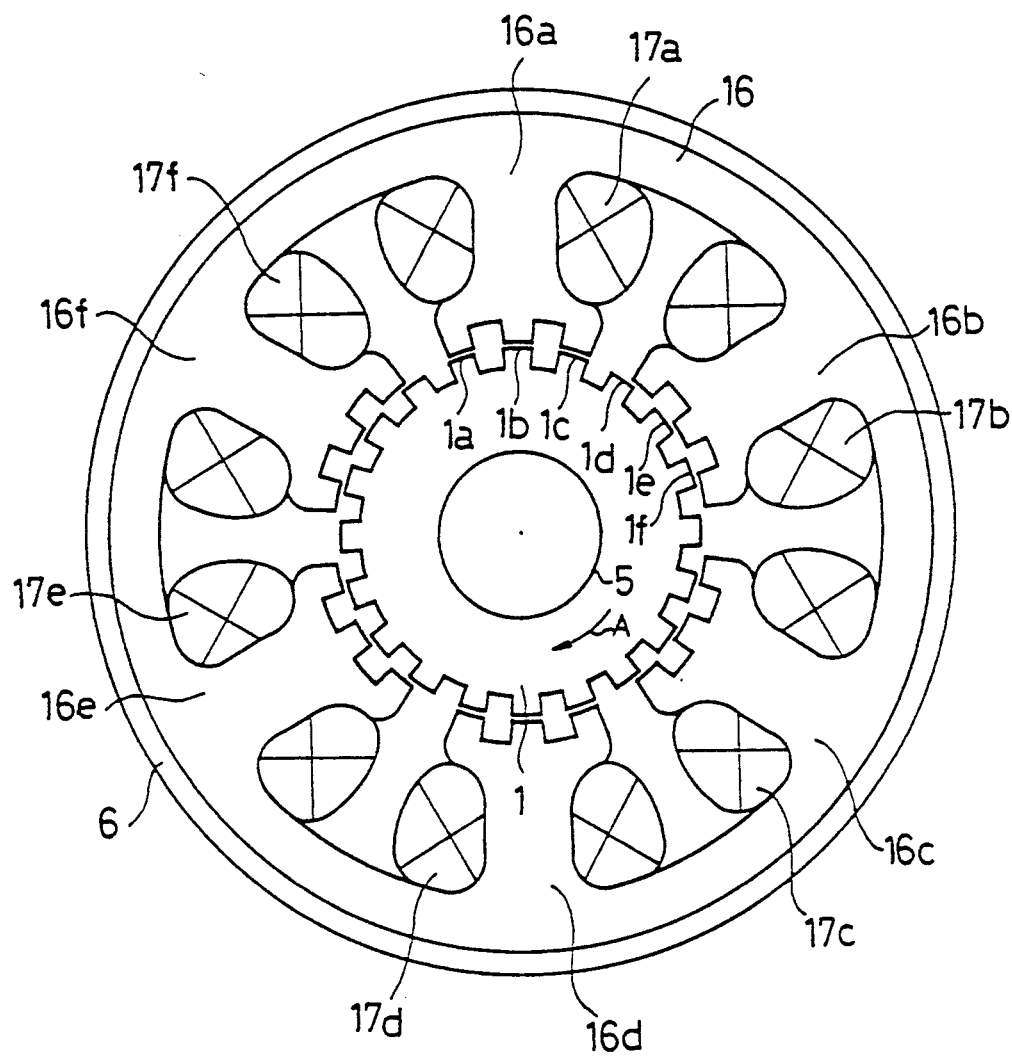
FIG. 4 is a plane view showing a three-phase half-wave reluctance type motor.

FIG. 4 is a plane view showing a three-phase half-wave current supply mode motor. An outer casing 6 is coupled to the armature 16. Six magnetic poles 16a, 16b, - - - are formed to protrude from the armature 16, and are associated with armature coils 17a, 17b, - - - . Each magnetic pole is provided with three teeth. A rotor 1 is fixed to a rotational shaft 5 and is rotatably supported by bearings (not shown). On an outer surface of the rotor 1, equally pitched salient poles 1a, 1b, - - - having the same width are provided. These salient poles face to the magnetic poles through an air gap. The tooth of the magnetic pole has a 180-degree width which is the same as that of the salient pole. Both the armature 16 and the rotor 1 are made of the laminated structure of silicon steel plates. The rotational shaft 5 is connected through the speed reduction device to the load.

Next, with reference to FIG. 9, a means for supplying currents to respective exciting coils will be explained.

Figure 9:
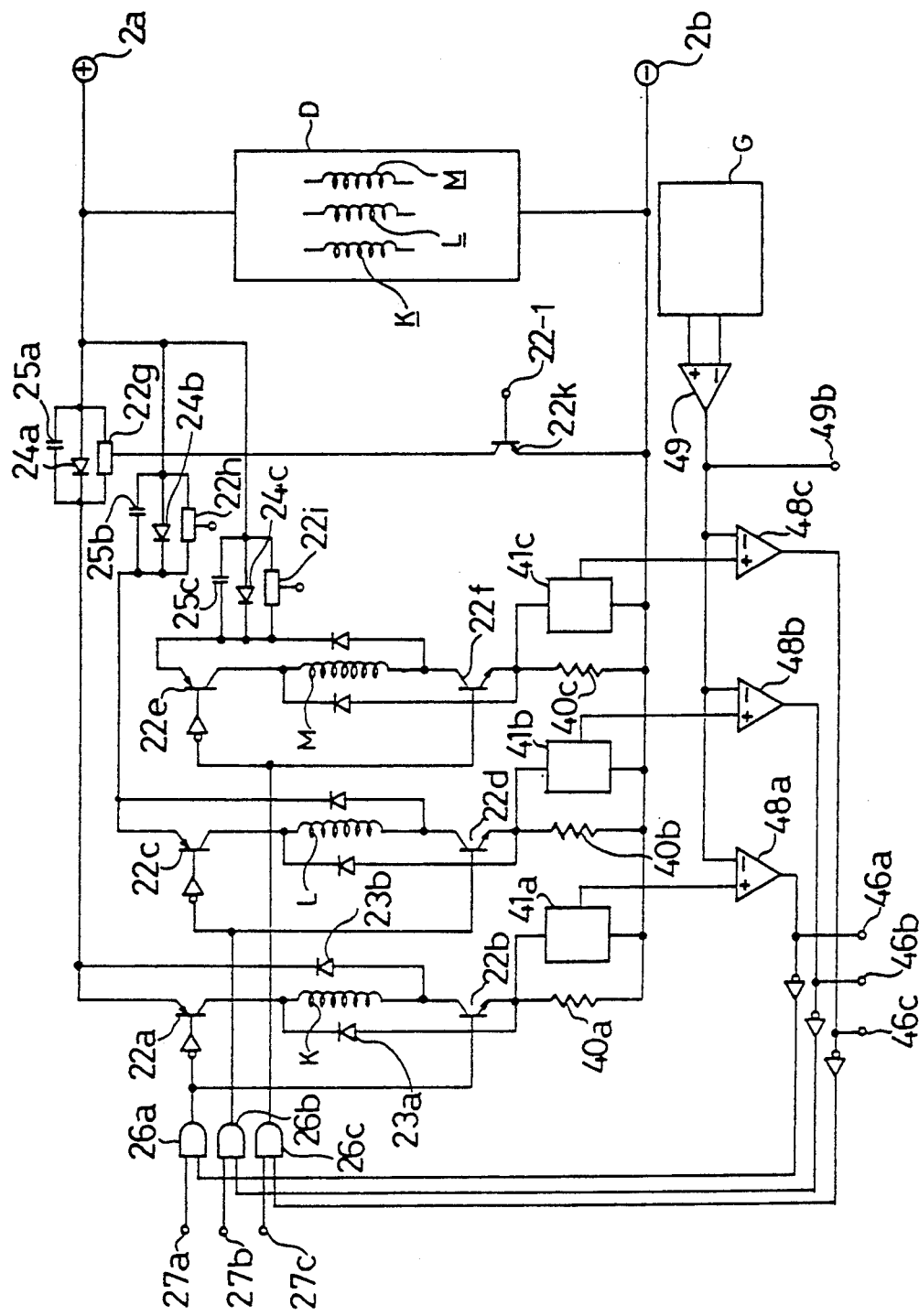
FIG. 9 is a circuit diagram showing a current supply control circuit for the three-phase reluctance type motor.

In FIG. 9, transistors 22a and 22b, transistors 22c and 22d, and transistors 22e and 22f are connected to both ends of the armature coils K, L and M, respectively. Diodes 23a and 23b, - - - are inversely connected to serial connecting units, each consisting of an armature coil and its associated transistor. The terminal 46a is connected to the terminal 22-1. When the transistors 22a and 22b are turned off in a section where a braking torque of a reverse rotation mode is generated, the transistors 22g and 22k are turned on so that the magnetic energy stored in the armature coil K can be recovered into the electric power source without passing through the diode 24a.

Magnetic energies stored in the armature coils L and M are recovered in the same manner by turning on the transistors 22h and 22i in response to the outputs from the terminals 46b and 46c. The armature coil K consists of the armature coils 17a and 17d of FIG. 4, which are connected in series or in parallel with each other. The armature coil L consists of the armature coils 17b and 17e, which are connected in series or in parallel with each other. Also, the armature coil M consists of the armature coils 17c and 17f, which are connected in series or in parallel with each other. By using a means similar to the device explained in FIGS. 5 and 6, the position detecting signals can be obtained by detecting the positions of the salient poles 1a, 1b, - - - .

Figure 16:
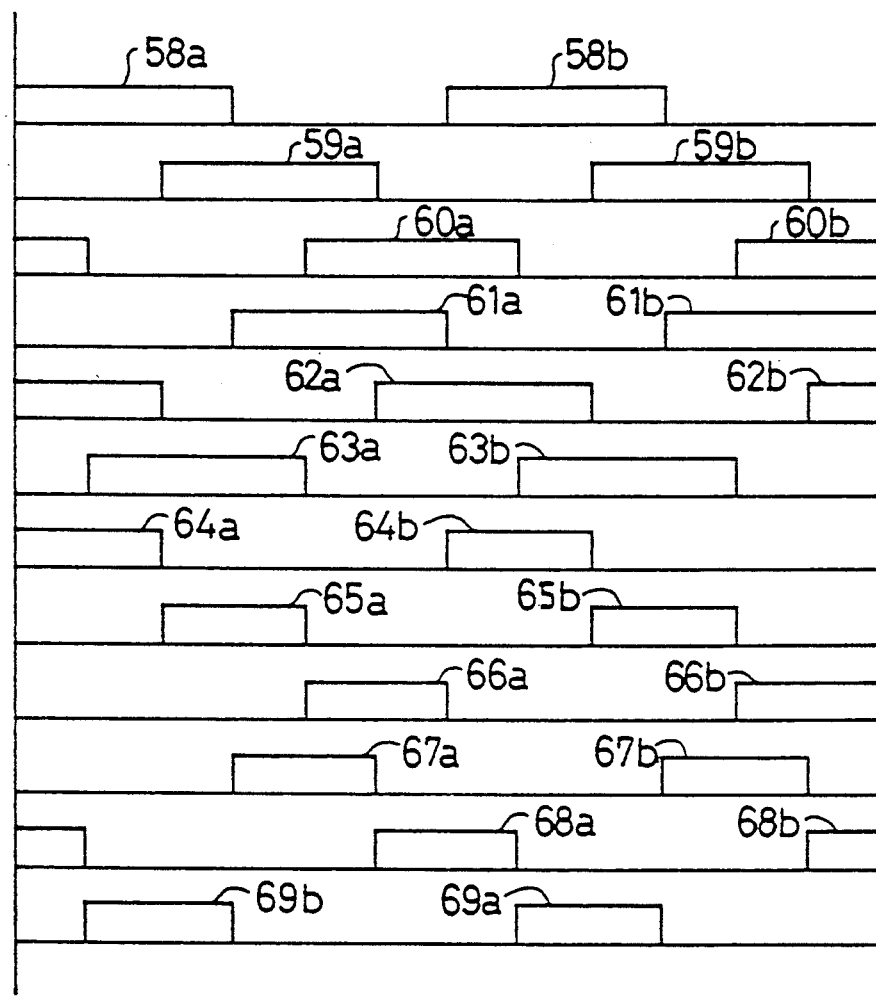
FIG. 16 is a time chart showing three-phase position detecting signals.

FIG. 16 shows the time chart of the position detecting signals. In FIG. 16, curves 58a, 58b, - - - have the same width and are spaced from one another by the same angle. Curves 59a, 59b, - - - and curves 60a, 60b, - - -are delayed from the above-described No. 1-phase position detecting signals by 120 degrees and have the same waveforms to serve as No. 2- and No. 3-phase position detecting signals, respectively.

Curves 61a, 61b, - - - , curves 62a, 62b, - - - , and curves 63a, 63b, - - - show the inverted signals of the No. 1-, No. 2- and No. 3-phase position detecting signals.

The above-described position detecting signals are obtained from the position detecting elements spaced from one another by 120 degrees and disposed to face to the salient poles 1a, 1b, - - - .

Position detecting signal curves 64a, 64b, - - - of 120-degree width can be obtained from the AND circuit which inputs electric signals of the curves 58a, 58b, - - - and the curves 62a, 62b, - - - -. By the similar means, 120-degree position detecting signal curves 65a, 65b, - - -, curves 66a, 66b, - - -, curves 67a, 67b, - - -, curves 68a, 68b, - - -, and curves 68a, 68b, - - - are obtained.

Terminals 27a, 27b, and 27c of FIG. 9 are supplied with electric signals of the curves 64a, 64b, - - -, the curves 65a, 65b, - - -, and the curves 66a, 66b, - - -. A block circuit G has the same constitution as the circuit portion surrounded by the dotted line G of FIG. 8.

As the current supply control circuit of the armature coil K of FIG. 8 has the completely same constitution as the current supply control circuit of the armature coil K of FIG. 9, the armature coil K of FIG. 9 is activated in accordance with the widths of curves 64a, 64b, - - -.

By the same reason, the armature coils L and M are also activated in accordance with the widths of curves 65a, 65b, - - - and curves 66a, 66b, - - -, respectively. Therefore, their functions and effects are similar.

Accordingly, the motor functions as a three-phase half-wave reluctance type motor so as to realize a motor capable of rotating at a high speed with good efficiency. By exchanging the inputs between the terminals 27b and 27c, the operation mode of the motor can be changed to the reverse rotation mode, and the regenerative braking can be realized. The object of the present invention can be accomplished by utilizing a logic circuit having the same technical conception as the circuit of FIG. 11. In this case, a three-phase half-wave pulse distributer is used instead of the F circuits 36a, 36b, and 36c of FIG. 11.

Figure 17:
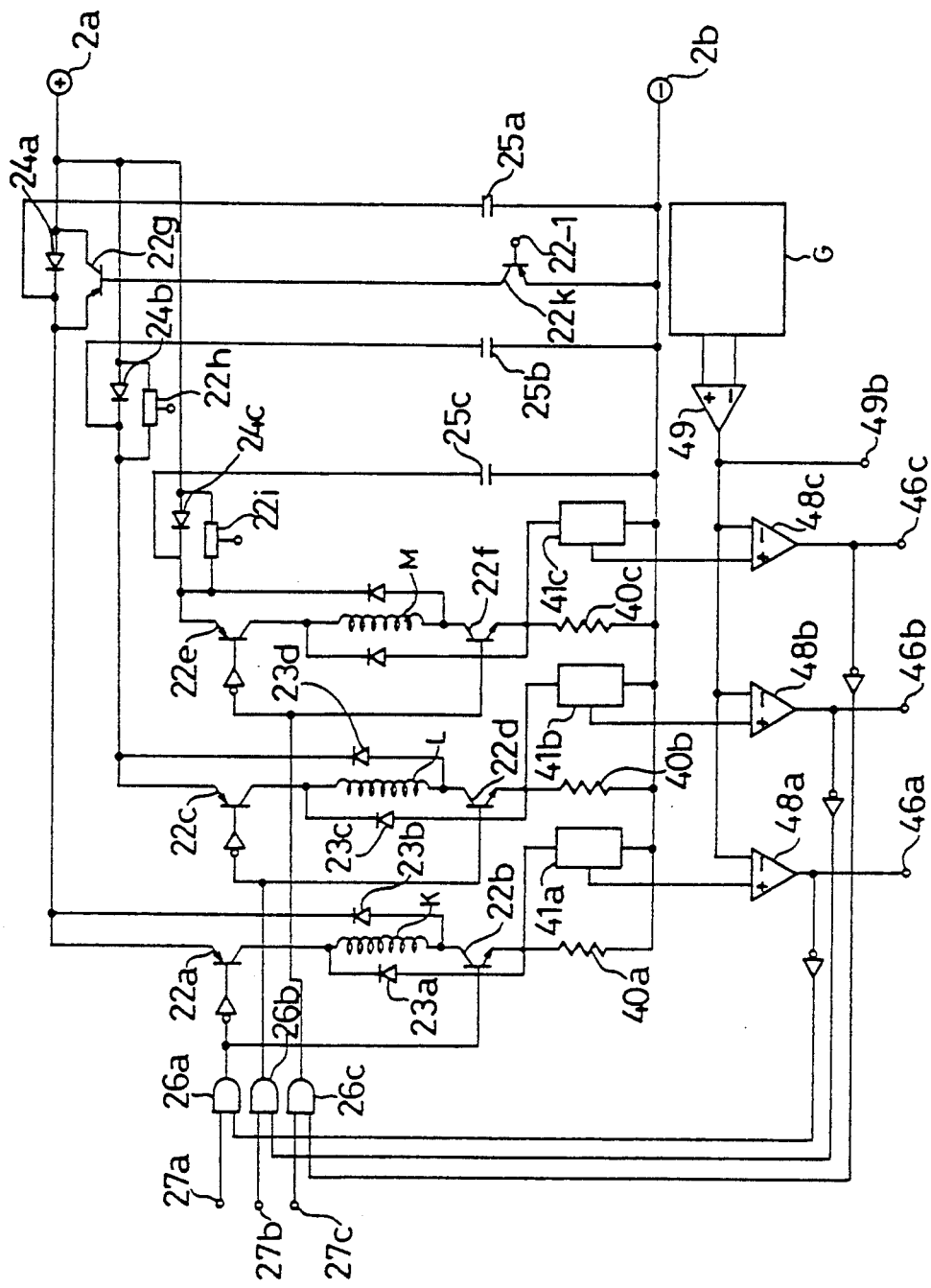
FIG. 17 is a circuit diagram showing a current supply control circuit for the three-phase half-wave current supply mode reluctance type motor.

As can be understood from the foregoing description, the object of the present invention can be accomplished by the means provided thereby. A current supply control circuit for the armature coils K, L and M shown in FIG. 17 is the circuit similar to that of FIG. 9, but is different from the circuit of FIG. 9 in that the capacitors 25a, 25b, and 25c are differently connected. However, its function and effect are similar to that of the circuit of FIG. 9.

The number of magnetic poles of FIG. 4 can be changed to 12 pieces, and respective magnetic poles are associated with armature coils. Respective armature coils are suffixed with reference numerals 17a, 17b, 17c, - - -, 17l in a clockwise direction, and the number of salient poles is increased correspondingly. Symmetrically positioned sets of two armature coils are referred respectively to armature coils K, K̲, L, L̲, and M, M̲ in a clockwise direction.

A block circuit D of FIG. 9 including the armature coils K̲, L and M has the same constitution as the current supply control circuit for the armature coils K, L and M.

The electric signals of position detecting signal curves 64a, 64b, - - -, curves 65a, 65b, - - -, and curves 66a, 66b, - - - are inputted from the terminals 27a, 27b, and 27c, respectively, and the electric signals of position detecting signal curves 67a, 67b, - - -, curves 68a, 68b, - - -, and curves 67a, 67b, - - - are inputted into the block circuit D, so that the motor is driven as a three-phase full-wave reluctance type motor by controlling current supply to corresponding armature coils.

With a logic circuit having the same technical conception as the circuit of FIG. 11, the motor can be driven as a reluctance type motor when starting, whereas the regenerative braking is available in the latter half, and further the motor can be driven as a stepping motor in the final stage so as to shift the load.

The function and effect are the same as the previous embodiment.

Figure 2:
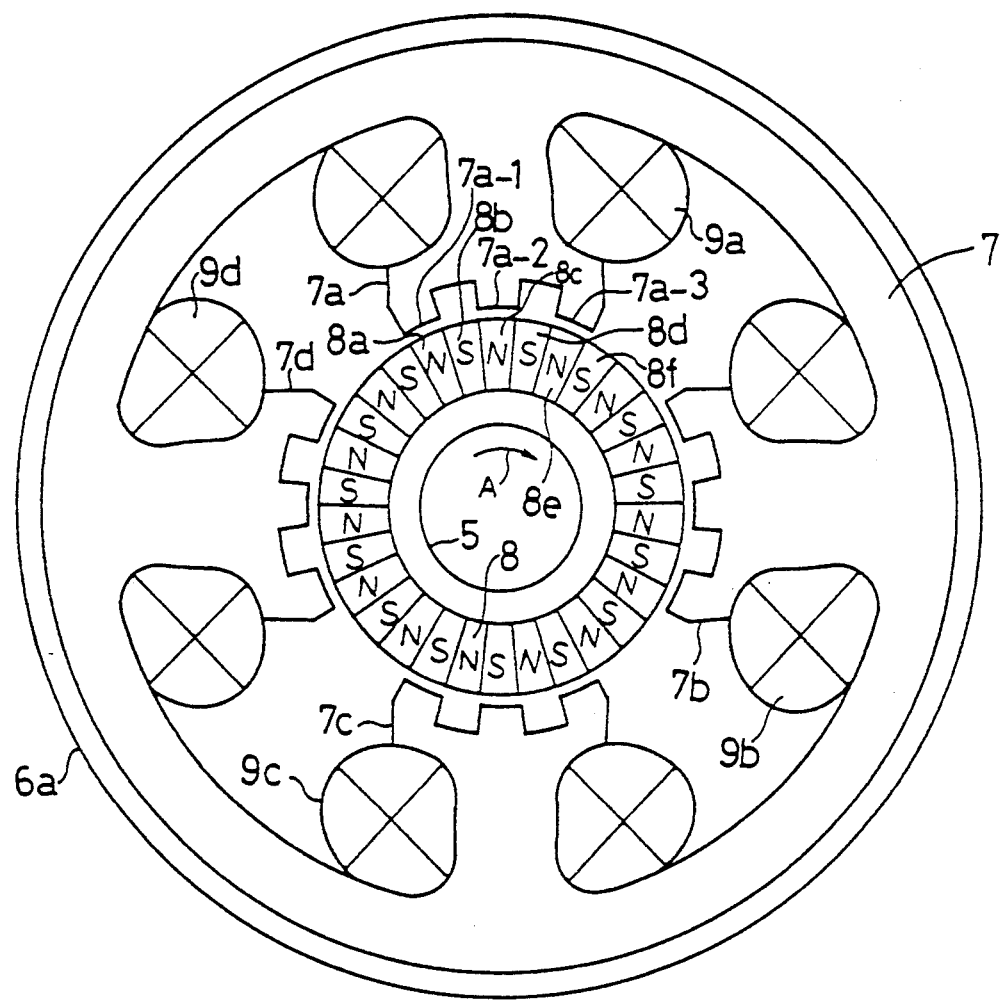
FIG. 2 is a plane view showing a two-phase DC motor.

Next explained is a case of an embodiment of the present invention applied to a two-phase full-wave current supply mode DC motor equipped with a magnetic rotor. FIG. 2 is a plane view of this embodiment.

An outer casing 6a is coupled to an armature 7. Four magnetic poles 7a, 7b, - - - are protruded from the armature 7 and uniformly spaced from one another with equal pitch. Respective magnetic poles are associated with armature coils 9a, 9b, - - -, and are provided with teeth 7a-1, 7a-2, - - - -. A rotational shaft 5 is rotatably supported by bearings (not shown). A magnet rotor 8 is fixed to the rotational shaft 5 through a mild steel cylinder which serves as a magnetic path. The rotational shaft 5 is connected to the load through a speed reduction device or a torque transmitting device. A circumferential portion of the magnet rotor 8 are magnetized to constitute N- and S-poles 8a, 8b, - - - as shown in the drawing. These magnetic poles 8a, 8b, - - -have the same width of 180 degrees. The tooth is made to have the same width as the magnetic pole. The magnetic poles 7a and 7c are symmetrically positioned, and also the magnetic pole 7b and 7d are symmetrically positioned.

The teeth of the magnetic poles 7a and 7c, and the teeth of the magnetic poles 7b and 7d have a mutual phase difference of 90 degrees. A serial or parallel connecting unit of the armature coils 9a and 9c is referred to as an armature coil 9-1, and a similar connecting unit of the armature coils 9b and 9d is referred to as an armature coil 9-2. Though the number of magnetic poles is three, it can be increased if necessary.

Next, with reference to FIG. 10, current supply to the armature coils 9-1 and 9-2 will be explained in detail.

Figure 10:
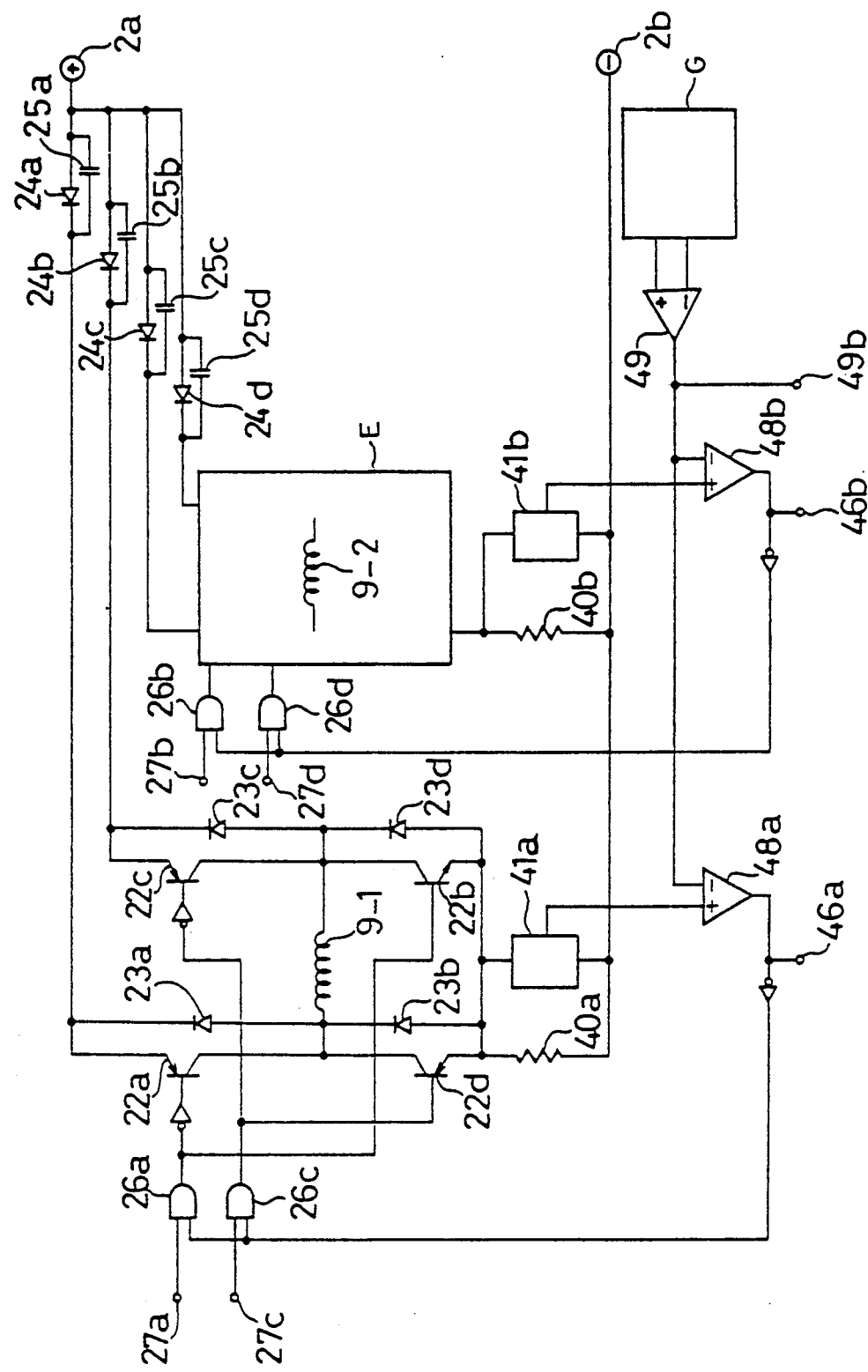
FIG. 10 is a circuit diagram showing a current supply control circuit for the two-phase full-wave current supply mode DC motor.

Though the terminals 27a, 27b, - - - of FIG. 10 are supplied with position detecting signals of the magnetic poles 8a, 8b, - - - which are obtained by means of a conventional detecting device, these position detecting signals are the same as those of the reluctance type motor which is previously described with reference to FIG. 15. Thus, a current supply to the armature coil in response to the position detecting signal shown in FIG. 15 will be explained.

In FIG. 10, the armature coil 9-1 and the transistors 22a, 22b, - - - constitutes a bridge circuit. A block circuit E is a bridge circuit including the armature coil 9-2, having the same constitution as the above bridge circuit. The position detecting signals of the curves 54a, 54b, - - -, and the curves 56a, 56b, - - - of FIG. 15 are inputted to the terminals 27a and 27c. The electric signals of the curves 55a, 55b, - - -, and the curves 57a, 57b, - - - are inputted to the terminals 27c and 27d, respectively.

When the terminal 27a receives an input, the transistors 22a and 22b are turned on through the AND circuit 26a to activate the armature coil 9-1 so that its exciting current flows in a right direction, whereas, when the terminal 27c receives an input, the transistors 22c and 22d are turned on through the AND circuit 26c to activate the armature coil 9-1 so that its exciting current flows in a left direction.

The operational amplifier 48a, the resistance 40a, and the absolute-value circuit 41a have the same functions as those of components suffixed with the same reference numerals in the previous embodiment, and so they constitute a chopper circuit, which supplies the armature coil with the current corresponding to the standard voltage of the terminal 49b, when the armature coil is activated in both directions.

The widths of the supplied current are equal to the 90-degree widths of the input signals of the terminals 27a and 27c. A chopper function by the resistance 40b, the absolute-value circuit 41b, and the operational amplifier 48b is carried out in the same manner as the above-described case.

The direction of the exciting current of the armature coil 9-2 is changed depending on whether input is made through the terminal 27b or the terminal 27d. Thus, the width of the supplied current becomes 90 degrees. The current value becomes a value corresponding to the standard voltage of the terminal 49b.

Accordingly, the motor is driven as a two-phase full-wave type DC motor, and the rotational shaft 5 shown in FIG. 2 rotates in a direction of an arrow A. As a torque curve becomes symmetric when the magnetic rotor 8 rotates 180 degrees, the maximum efficiency can be obtained by supplying the current only in a central 90-degree section of the torque curve.

It is possible to change the width of the current supply section from 90 degrees to 120 degrees. In such a case, an output torque is increased, but an efficiency is deteriorated.

Diodes 24a, 24b, - - - and capacitors 25a, 25b, - - - are provided for speeding the building-up and trailing-off of exciting current when the armature coils are activated in response to the position detecting signals. Functions and effects of these diodes 24a, 24b, - - - and capacitors 25a, 25b, - - - are the same as those of the previous embodiment.

If the input signals of the terminals 27a and 27c, and terminals 27b and 27d are exchanged in a normal rotation mode, the operating condition of the motor is changed to a reverse rotation mode. In this case, the regenerative braking takes place, and thus obtained regenerative energy is recovered through the capacitors 25a, 25b, - - - into the electrical power source. For this reason, it is preferable to increase the capacitances of the capacitors 25a, 25b, - - - than the previous embodiment.

It is also possible to adopt the same means as the previous embodiment. That is, transistors can be connected in parallel with the diodes 24a, 24b, - - - in the same manner as the previous embodiment, whereas, the bases of the transistors can be controlled by the output signals of the terminals 46a and 46b.

If the electric signals of the curves 50a, 50b, - - - of FIG. 15 and three sets of electric signals indicated below the curves 50a, 50b, - - -, that is, stepping electric signals, are inputted into the terminals 27a, 27b, 27c, and 27d, the motor is driven as a stepping motor.

With a logic circuit of FIG. 11, a current supply control similar to the case of the previously described two-phase reluctance type motor can be carried out so as to perform the numerical control of the load. Its function and effect are also similar to the case of the above-mentioned motor.

The position detecting signals of the curves 54a, 54b, - - - of FIG. 15 and three sets of position detecting signals indicated below the curves 54a, 54b, - - - are inputted into the terminals 31a, 31b, - - - of FIG. 11, whereas the outputs of the terminals 34a, 34b, - - - are inputted to the terminals 27a, 27b, - - - of FIG. 10. The terminal 32-1 of FIG. 11 is supplied with the above-described differential pulses of the starting point obtained by differentiating the position detecting signals. Input signals of the terminals 37a, 37b, 37c, and 37d are also the above-described differential pulses.

An output from the terminal 32 is an electric signal used for switching between a normal rotation mode and a reverse rotation mode. An output of the terminal 26-1 becomes an input signal of the block circuit G of FIG. 10. The rotational speed and the braking torque of the motor are controlled by the signal read out from the ROM 25.

Because of the above constitution, the numerical control of the load can be carried out in the same manner as the previously described two-phase reluctance type motor. If the block circuit G of FIG. 10 and the circuit surrounded by the dotted line G-1 of FIG. 11 are removed, the numerical control of the load can be carried out in such a manner that the acceleration torque and the braking torque of the motor are obtained corresponding to the standard voltage of the terminal 49b of FIG. 10.

Though its function and effect are the same as the previous embodiment, this embodiment becomes useful in the cases of relatively light loads.

If the motor is to be operated in a three-phase full-wave current supply mode, it is preferable to add one armature coil and provide a transistor bridge circuit for controlling the activation of this armature coil. In such a case, the object of the present invention can be accomplished by modifying a circuit including flip-flop circuits 36a, 36b, and 36c of FIG. 11 to incorporate a clock pulse oscillator for generating three-phase stepping electric signals and a pulse distributer.

In this case, the electric signals shown in FIG. 16 are used as the position detecting signals. The same object of the present invention can also be accomplished by the similar means even when the motor is driven in an n-phase (n=2, 3, - - -) current supply mode.

INDUSTRIAL APPLICABILITY

The present invention is utilized as a high-speed numerically controlled load actuating apparatus, more particularly as a numerically controlled load actuating apparatus which is required to quickly shift or move a load and stop at its stopping position with a high accuracy even in the case where the load is a heavy load such as one having a driving force of, for example, 10 kilogram weight-1000 kilogram weight.

What is claimed is:

1. A numerically controlled load actuating apparatus, wherein a load is driven with a motor having n-phase (n=2, 3, 4, - - -) full-wave salient poles or a magnet rotor; said numerically controlled load actuating apparatus comprising:

n-phase armature coils associated with n-phase magnetic poles of a fixed armature;

a current supply control circuit including said respective phase armature coils and a plurality of transistors;

diodes, inversely connected in parallel with said respective transistors in said current supply control circuit, for returning magnetic energies stored in respective armature coils to an electric power source when said armature coils are deactivated;

a DC electric power source for applying a voltage to said current supply control circuit;

2n pieces of back-flow preventing diode interposed in a forward direction with respect to a positive or a negative terminal of said DC electric power source;

a pulse distributor driven in response to outputs of an oscillator to generate stepping electric signals of n-phase full-wave current supply mode having a predetermined frequency;

small-capacitance capacitors disposed in parallel with said back-flow preventing diodes, respectively;

a position detecting device including a plurality of position detecting elements for detecting rotational positions of salient poles or magnetic poles on said magnet rotor so as to obtain position detecting signals of n-phase full-wave current supply mode;

a first electric circuit for obtaining an electric pulse row having a frequency corresponding to a frequency of said position detecting signals;

a second electric circuit for turning on said respective transistors in the current supply control circuit in response to said position detecting signals to let the DC motor generate a necessary torque;

a third electric circuit for turning on said respective transistors in the current supply control circuit in response to said stepping electric signals to let the stepping motor generate a necessary torque;

a first counter circuit for registering a required amount of shift of load by inputting corresponding number of electric pulse and a second counter circuit for registering approximately half of the number of said electric pulse;

a fourth electric circuit, which starts counting down said first and second counter circuits in response to said electric pulse row to be generated simultaneously with the start of said motor, reads out a digital memory stored in a ROM simultaneously, and further reverses the reading out operation of the digital memory of said ROM in response to an output of a zero-count signal from said second counter circuit;

a first rotational speed control device, which converts said digital memory into an analogue signal and controls a rotational speed of said motor to a rotational speed corresponding to said analogue signal;

a second rotational speed control device, which changes a mode of said motor to generate a braking torque in response to the output of zero-count signal from said second counter circuit and reduces rotational speed of the motor to a rotational speed corresponding to said analogue signal obtained from said ROM; and a fifth electric circuit, which changes a driving operation mode of the motor to the mode of a stepping motor operation in response to an output signal representing a predetermined residual number, and responds to the output signal representing the zero-count to prevent the output signal of said oscillator from being inputted to said pulse distributer.

2. A numerically controlled load actuating apparatus, wherein a load is driven with a motor having n-phase (n=3, 4, 5, - - - ) half-wave salient poles or a magnet rotor; said numerically controlled load actuating apparatus comprising:

n-phase armature coils associated with n-phase magnetic poles of a fixed armature;

a current supply control circuit including said respective phase armature coils and a plurality of transistors;

diodes inversely connected in parallel with said respective transistors in said current supply control circuit for returning magnetic energies stored in respective armature coils to an electric power source when said armature coils are deactivated;

a DC electric power source for applying a voltage to said current supply control circuit;

n pieces of back-flow preventing diode interposed in a forward direction with respect to a positive or a negative terminal of said DC electric power source;

a pulse distributer driven in response to outputs of an oscillator so as to generate stepping electric signals of n-phase half-wave current supply mode having a predetermined frequency;

small-capacitance capacitors disposed in parallel with said back-flow preventing diodes, respectively;

a position detecting device including a plurality of position detecting elements for detecting rotational positions of salient poles or magnetic poles on said magnet rotor so as to obtain position detecting signals of n-phase half-wave current supply mode;

a sixth electric circuit for obtaining an electric pulse row having a frequency corresponding to a frequency of said position detecting signals;

a seventh electric circuit for turning on said respective transistors in the current supply control circuit in response to said position detecting signals so as to obtain an output torque for the DC motor;

an eighth electric circuit for turning on said respective transistors in the current supply control circuit in response to said stepping electric signals so as to obtain a stepping output torque for the stepping motor;

a first counter circuit for registering a required amount of shift of load by inputting corresponding number of electric pulse and a second counter circuit for registering approximately half of the number of said electric pulse;

a ninth electric circuit, which starts counting down said first and second counter circuits in response to said electric pulse row generated simultaneously with the start of said motor, reads out a digital memory stored in a ROM simultaneously and further reverses the reading out operation of the digital memory of said ROM in response to an output of a zero-count signal from said second counter circuit;

a first rotational speed control device which converts said digital memory into an analogue signal and controls a rotational speed of said motor to a rotational speed corresponding to said analogue signal;

a second rotational speed control device which changes a mode of said motor to generate a braking torque in response to the output of the zero-count signal of said second counter circuit and controls the rotational speed of the motor to decrease down to a rotational speed corresponding to said analogue signal obtained from said ROM; and a tenth electric circuit which shifts a driving operation mode of the motor to that of a stepping motor in response to an output signal representing a predetermined residual number, and responds to the output signal representing the zero-count to prevent the output signal from said oscillator from being inputted into said pulse distributer.

3. A numerically controlled load actuating apparatus in accordance with claim 2 comprising;

said first counter circuit for inputting electric pulses corresponding to a required shifting amount of the load to resister its electric pulse number, and said second counter circuit for registering approximately half of said electric pulse number;

an eleventh electric circuit which starts counting down said first and second counter circuits in response to said electric pulse row which is generated upon a starting of said motor;

a constant-current circuit for holding an armature current to a predetermined value after the motor is started;

a twelfth electric circuit for responding to said output signal representing the zero-count of the second counter circuit to brake the motor by generating a reverse torque while maintaining said predetermined armature current; and a thirteenth electric circuit which shifts a driving operation mode of the motor to that of a stepping motor in response to an output signal representing a first predetermined residual number, and responds to the output signal representing the zero-count to prevent the output signal from said oscillator from being inputted into said pulse distributer.

* * * * *

UNITED STATES PATENT AND TRADEMARK OFFICE
CERTIFICATE OF CORRECTION

PATENT NO. : 5,264,772
DATED : November 23, 1993
INVENTOR(S) : Itsuki BAHN

It is certified that error appears in the above-indentified patent and that said Letters Patent is hereby corrected as shown below:

Column 16, line 41, after "motor." should be –When– not "when".

Column 21, line 4, delete "–, and curves 68a, 68b–" (second occurrence).

Column 21, line 59, "67a, 67b" should be –69a, 69b–.

Signed and Sealed this

Fifth Day of July, 1994

BRUCE LEHMAN

*Attest:*

*Attesting Officer*   *Commissioner of Patents and Trademarks*